(12) United States Patent
Ballentine

(10) Patent No.: US 8,702,339 B2
(45) Date of Patent: Apr. 22, 2014

(54) CLAMP

(75) Inventor: Trent Ballentine, Normal, IL (US)

(73) Assignee: Manic Nomad, LLC, Normal, IL (US)

( * ) Notice: Subject to any disclaimer, the term of this patent is extended or adjusted under 35 U.S.C. 154(b) by 158 days.

(21) Appl. No.: 13/167,891

(22) Filed: Jun. 24, 2011

(65) Prior Publication Data
US 2012/0324682 A1 Dec. 27, 2012

(51) Int. Cl.
*F16M 11/14* (2006.01)

(52) U.S. Cl.
USPC .... 403/322.4; 403/90; 403/109.5; 248/181.1; 248/222.13

(58) Field of Classification Search
USPC ............. 403/90, 109.5, 143, 144, 322.4, 325, 403/DIG. 9; 248/181.1, 181.2, 221.11, 248/222.11, 222.13
See application file for complete search history.

(56) References Cited

U.S. PATENT DOCUMENTS

| | | | |
|---|---|---|---|
| 138,385 A | 4/1873 | Elliott | |
| 453,649 A | 6/1891 | Lindsey | |
| 687,347 A * | 11/1901 | Stapleton | 248/181.1 |
| 1,187,109 A | 6/1916 | Steuernagel | |
| 1,241,215 A | 9/1917 | Hoffmann | |
| 1,918,519 A | 7/1933 | Clements | |
| 2,260,995 A * | 10/1941 | Kruczek | 403/90 |
| 2,433,594 A * | 12/1947 | Calo | 84/421 |
| 3,211,405 A * | 10/1965 | Fey et al. | 248/183.2 |
| 4,029,279 A * | 6/1977 | Nakatani | 248/188.5 |
| 4,174,900 A | 11/1979 | Ina | |
| 4,185,936 A | 1/1980 | Takahashi | |
| 4,214,724 A * | 7/1980 | Geiger | 248/167 |
| 4,339,113 A | 7/1982 | Vosper | |
| 4,430,017 A | 2/1984 | Stefancich | |
| 4,596,484 A | 6/1986 | Nakatani | |
| D286,369 S | 10/1986 | Hahn | |
| 4,761,092 A * | 8/1988 | Nakatani | 403/104 |
| 4,893,810 A | 1/1990 | Lee | |
| 4,974,802 A * | 12/1990 | Hendren | 248/181.1 |
| 5,591,109 A * | 1/1997 | Strnad | 482/107 |
| 5,694,695 A | 12/1997 | Lund | |
| 6,142,699 A | 11/2000 | Pao | |
| 6,352,228 B1 * | 3/2002 | Buerklin | 248/181.1 |
| 6,581,528 B2 | 6/2003 | Tseng | |
| D477,979 S | 8/2003 | Hermann | |
| 6,854,697 B2 * | 2/2005 | Akaike | 248/161 |
| 6,942,187 B2 | 9/2005 | Blackburn | |
| D543,820 S | 6/2007 | Brass et al. | |
| 7,288,117 B2 * | 10/2007 | Benson | 623/38 |
| 7,300,028 B2 * | 11/2007 | Vogt | 248/181.1 |
| 8,257,231 B2 * | 9/2012 | Bingham et al. | 482/57 |
| 2006/0127167 A1 * | 6/2006 | Hsieh | 403/109.5 |
| 2008/0216262 A1 * | 9/2008 | Kennedy et al. | 15/144.2 |

* cited by examiner

*Primary Examiner* — Joshua Kennedy
(74) *Attorney, Agent, or Firm* — Andrus Intellectual Property Law, LLP

(57) ABSTRACT

A clamp is for clamping a first member to a second member. The clamp comprises a lever that is rotatably coupled to the first member and a plunger. The lever comprises a handle and a cam that rotate together about a rotational axis. Rotation of the lever about the axis in a first direction cams the plunger towards the second member to couple the first and second members together and wherein rotation of the lever about the axis in a second, opposite direction cams the plunger away from the second member to uncouple the first and second members from each other.

34 Claims, 27 Drawing Sheets

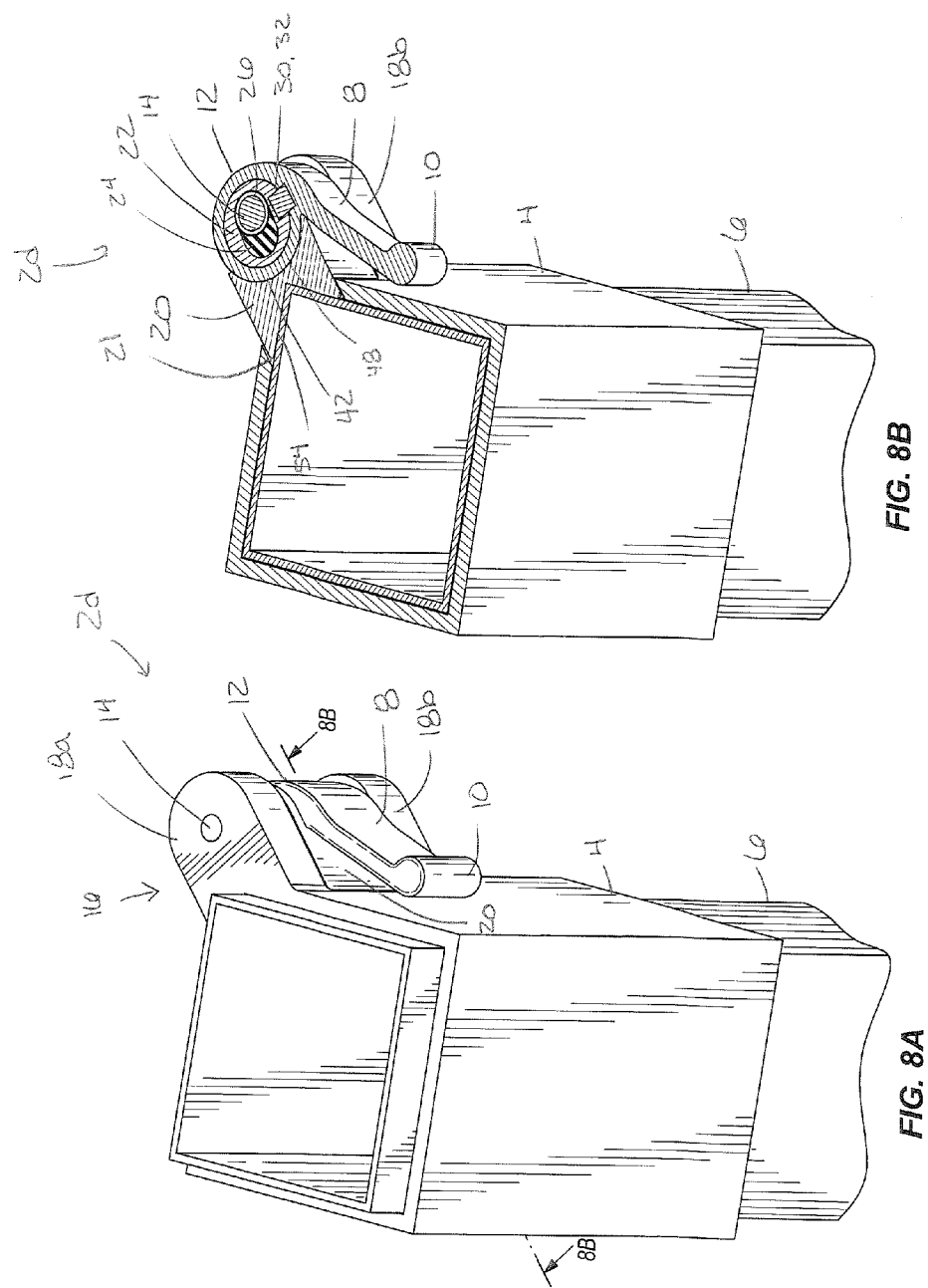

CLAMP

FIELD OF THE INVENTION

This disclosure relates to clamps for clamping a first member to a second member.

BACKGROUND OF THE INVENTION

U.S. Pat. No. 6,142,699 discloses a telescopic rod including a latch lock, an outer tube, a collar and an inner tube. The latch lock is formed with a fitting hold. A locating block is formed on an inner side of the fitting hole. The outer tube is fitted into the fitting hole of the latch lock. An outer edge of one end of the outer tube is formed with an axial recess. The locating block is inserted into the recess of the outer tube and the open side of the collar, preventing the collar from being rotated so as to enhance locking effect.

SUMMARY OF THE INVENTION

The present disclosure results from the inventor's research and development of clamping mechanisms for releasably clamping members together.

The present inventor has recognized that prior art clamping mechanisms are often ineffective and do not properly account for manufacturing tolerances in respective clamped parts. For example, the patent referenced herein above utilizes a pressing block that is loosely fitted in a window between pivot sections. The pressing block is actuated by rotation of a pressing lever to clamp inner and outer tubes together. This arrangement is limited because the pressing lever and pressing block are not forgiving and can only function with inner and outer tubes of a certain, relatively narrow design tolerance. Further, as the pressing block is not securely retained by the locking mechanism such that when the tubes are separated, the pressing block can fall out of the device and become lost and/or require replacement. Further, the pressing lever and pressing block do not securely uncouple the tubes from each other because the pressing block is free to engage with the inner tube after the pressing lever is moved into an open position. The inventor has thus recognized that there is a need for clamping mechanisms that are easier to operate to more securely clamp and release the respective members, and that are less subject to breakdown and/or maintenance requirements.

In one example, a clamp is for clamping a first member to a second member. The clamp comprises a lever that is rotatably coupled to the first member and a plunger. The lever comprises a handle and a cam that rotate together about a rotational axis. Rotation of the lever about the axis in a first direction cams the plunger towards the second member to couple the first and second members together and rotation of the lever about the axis in a second, opposite direction cams the plunger away from the second member to uncouple the first and second members from each other.

In another example, the second member comprises a pivoting member. Rotation of the lever about the pivot member in the first direction cams the plunger towards the second member to couple the first and second members together and thereby prevents pivoting of the pivoting member. Rotation of the lever in the second, opposite direction cams the plunger away from the second member to uncouple the first and second members from each other and thereby allows pivoting of the pivoting member. The first member can comprise a plurality of arms configured to retain the pivoting member with respect to the first member. At least one arm in the plurality of arms can be movable between a first position wherein the pivoting member is retained with respect to the first member and a second position wherein the pivoting member is not retained with respect to the first member.

In another example, the first member comprises a mount and the second member comprises a track with which the mount is slidably retained. The plunger can comprise a linkage and locking arms, the linkage coupling the plunger to the locking arms. Rotation of the lever about the pivot member in the first direction can cause the linkage to move the locking arms into engagement with the track to couple the first and second members together and rotation of the lever in the second, opposite direction to move the locking arms out of engagement with the track to uncouple the first and second members.

BRIEF DESCRIPTION OF THE DRAWING

FIG. 8A is a perspective view of another example of a clamp clamping first and second members together.

FIG. 8B is a view of section 8B-8B taken in FIG. 8A.

DETAILED DESCRIPTION OF THE DRAWINGS

Figure 1:
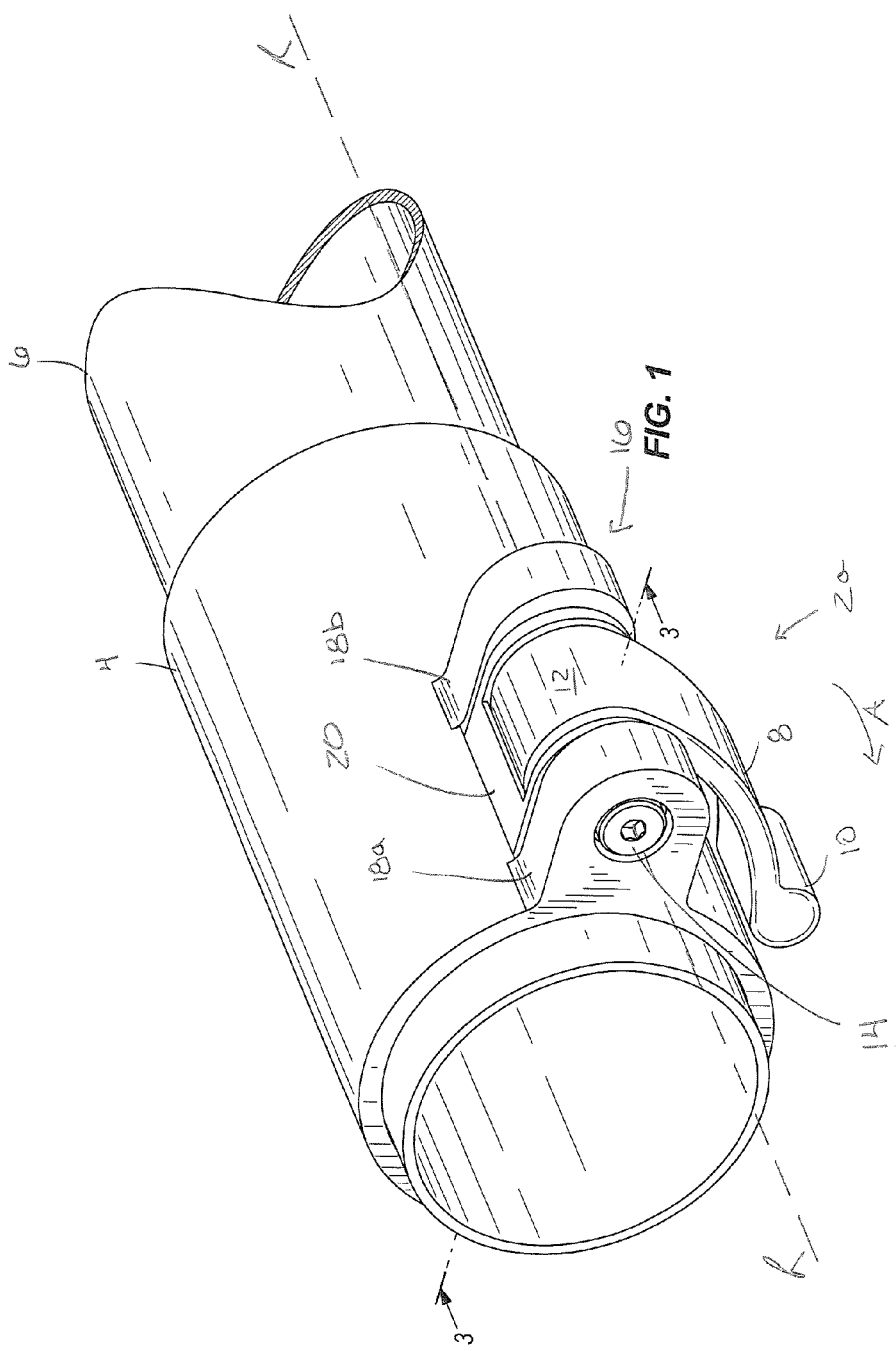
FIG. 1 is a perspective view of a clamp clamping first and second members together.

FIG. 1-27 depict various non-limiting embodiments of a clamp 2, designated 2a-2h. In the present disclosure, certain terms have been used for brevity, clearness and understanding. No unnecessary limitations are to be implied therefrom beyond the requirement of the prior art because such terms are used for descriptive purposes only and are intended to be broadly construed. The different apparatus described herein may be used alone or in combination with other apparatus. Various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

FIGS. 1-5 depict a clamp 2a for clamping a first member 4 to a second member 6. In the example shown, the first and second members 4, 6 are telescoping cylinders of the type that can be used for example in furniture legs or for supporting a bicycle seat; however the clamp 2 can be used with other types of first and second members in a variety of applications, as will become apparent from the examples described below. The clamp 2a includes a lever 8 that is rotatably coupled to the first member 4. The lever 8 includes a handle 10 and a cam 12 that rotate together about a pivot member 14, which in the example shown includes a screw. Other types of pivot members such as pins and/or the like can be employed. In the example shown, the pivot member 14 extends through the cam 12 and is supported by a clevis 16 that includes opposing supporting members 18a, 18b. A threaded connection (not shown) between the pivot member 14 and the opposing supporting members 18a, 18b connects the pivot member 14 to the clevis 16. The pivot member 14 thus defines a longitudinal axis R about which the lever 8, including the handle 10 and cam 12 rotate at least between the positions shown in FIGS. 1 and 2.

The clamp 2a also includes a plunger 20 for extending through a recess 21 (FIG. 2) in the first member 4 and engaging with the second member 6 to thereby couple the first and second members 4, 6 together and prevent relative longitudinal and rotational movement between the first member 4 and the second member 6. As explained further herein below, rotation of the lever 8 about the pivot member 14 in a first direction, shown at arrow A, cams the plunger 20 towards the second member 6 and thereby couples the first and second members 4, 6 together. Rotation of the lever 8 about the pivot member 14 in a second, opposite direction, shown at arrow B, cams the plunger 20 away from the second member 6 and thereby uncouples the first and second members 4, 6 from each other. Optionally, the lever 8 can rotate further than the position shown in FIGS. 2, 4 and 4B in the direction of arrow B. The limits of rotation of the lever 8 can be determined by engagement between the lever 8 and for example the surface of the plunger 20, as will be apparent from the following description.

Figure 4A:
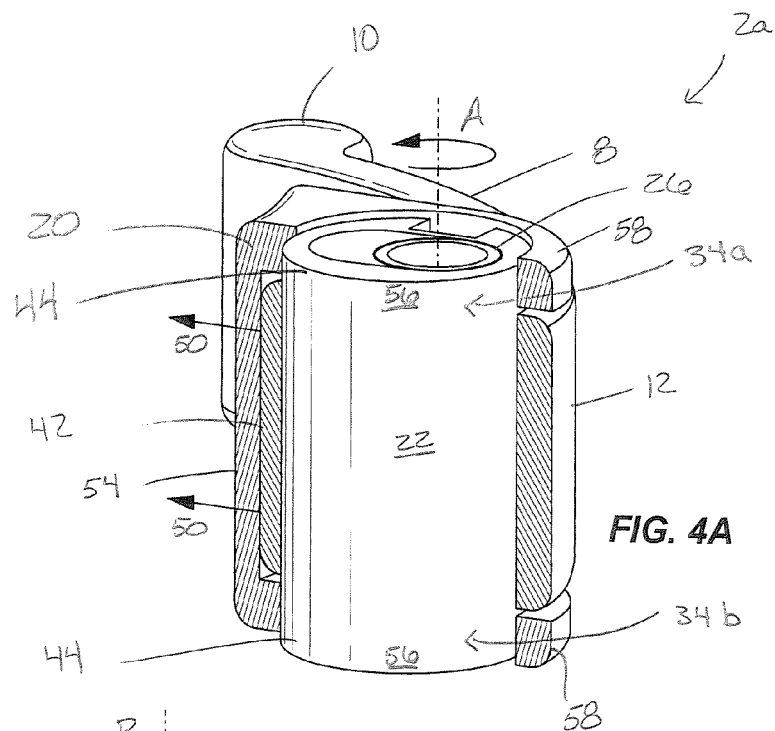
FIG. 4A is a partial section view of the clamp shown in FIG. 1, wherein the clamp is camming a plunger onto the second member.
Figure 4B:
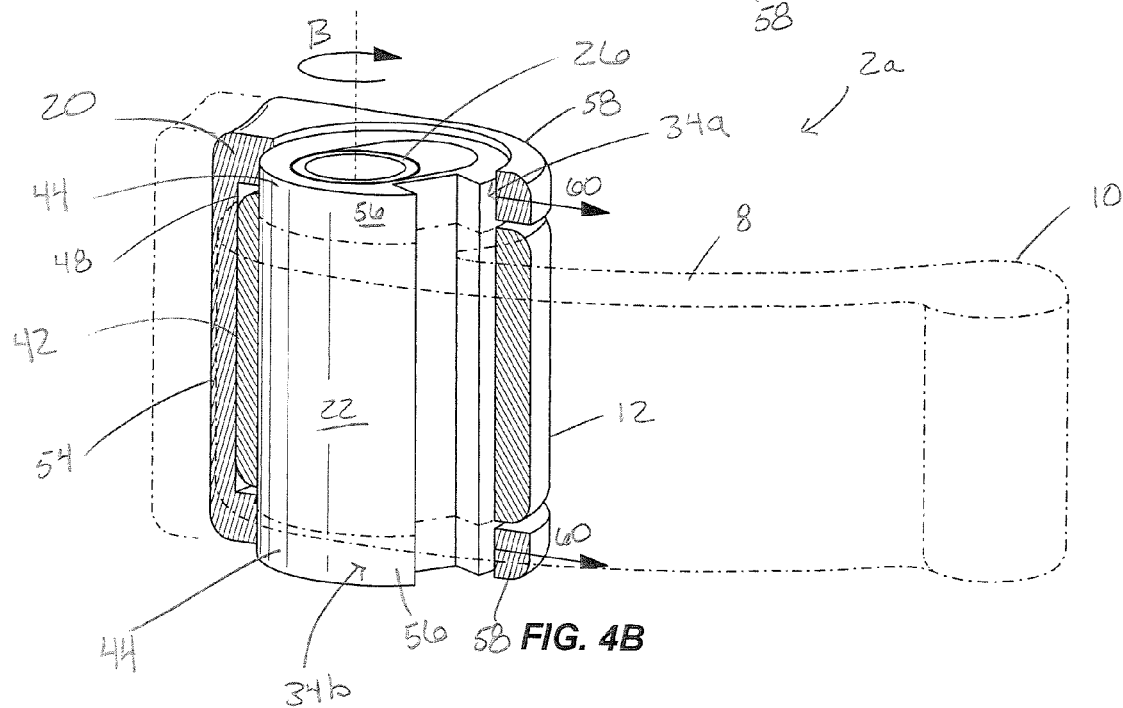
FIG. 4B is a partial section view of the clamp shown in FIG. 1, wherein the clamp is camming the plunger away from the second member.
Figure 5:
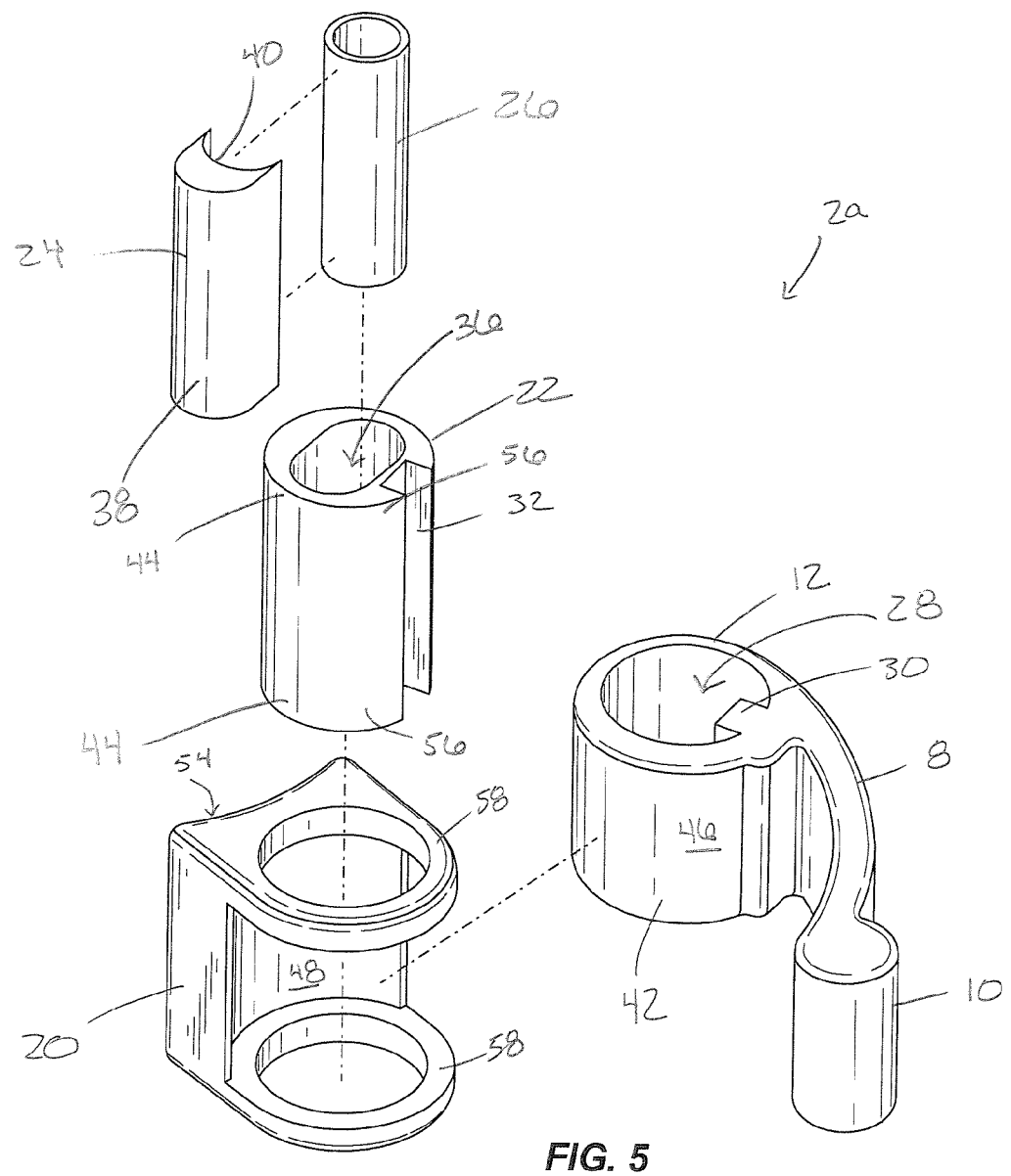
FIG. 5 is an exploded view of a clamp.
Figure 6A:
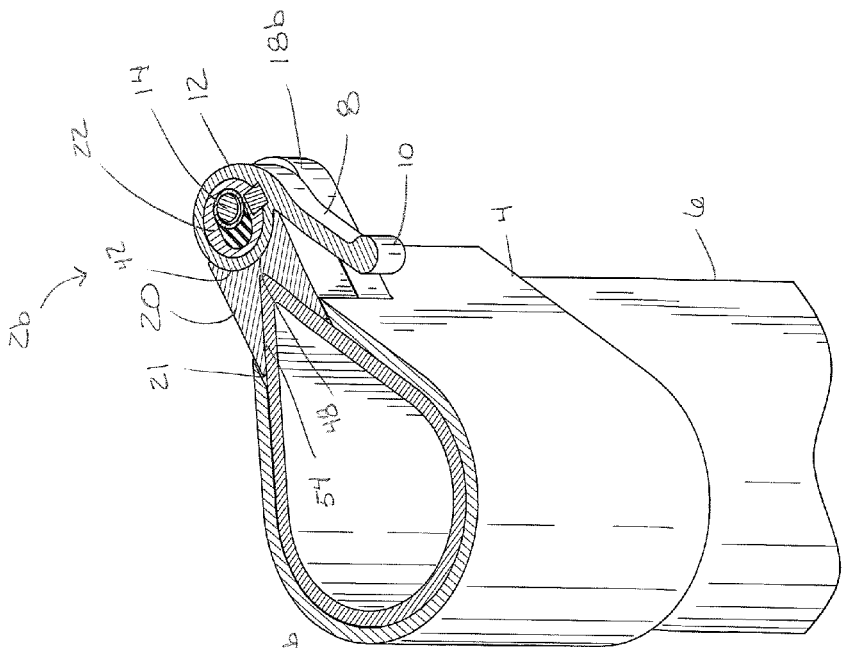
FIG. 6A is a perspective view of another example of a clamp clamping first and second members together.
Figure 6B:
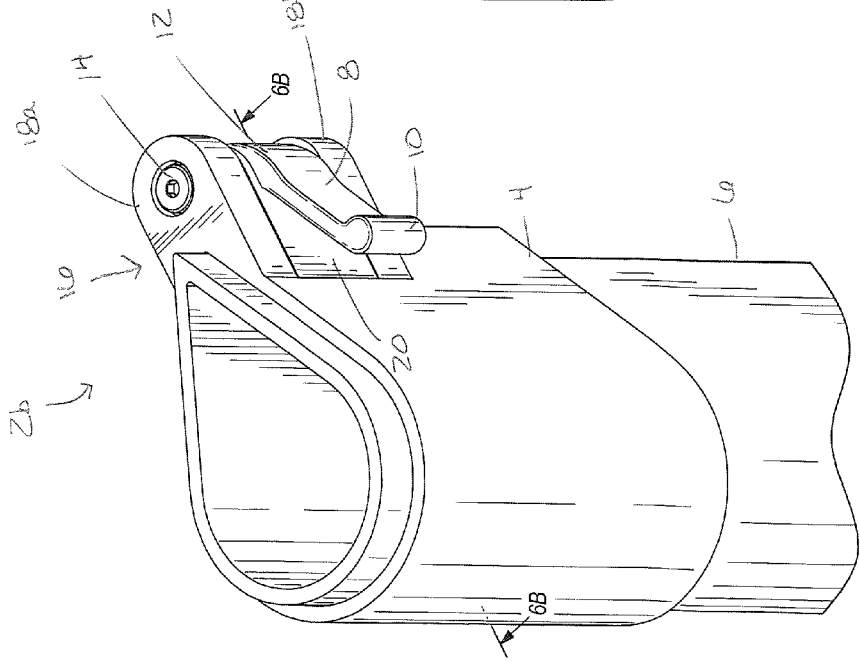
FIG. 6B is a view of section 6B-6B in FIG. 6A.
Figure 7B:
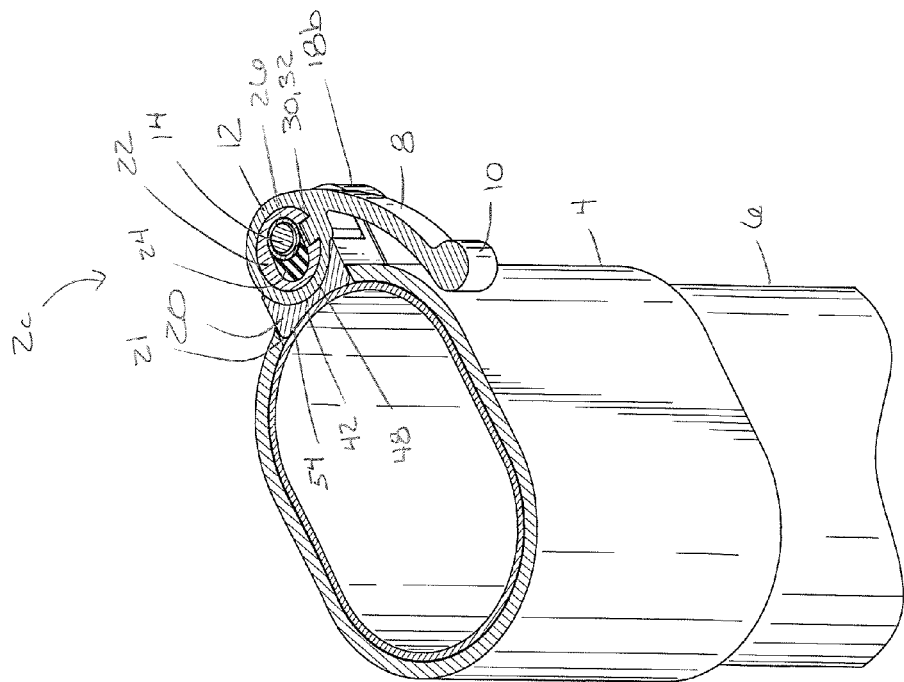
FIG. 7B is a view of section 7B-7B taken in FIG. 7A.
Figure 7A:
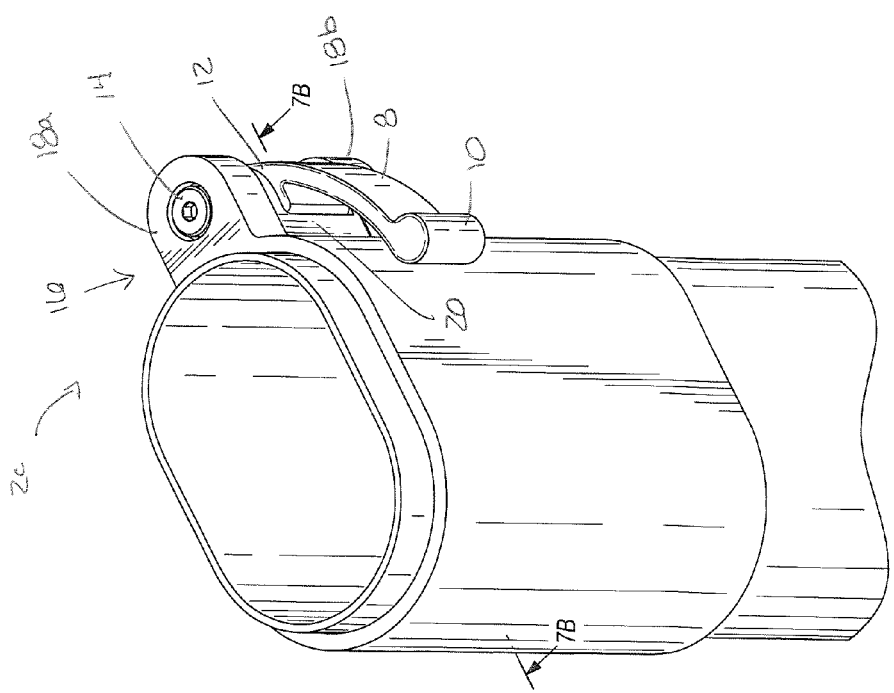
FIG. 7A is a perspective view of another example of a clamp clamping first and second members together.
Figure 9B:
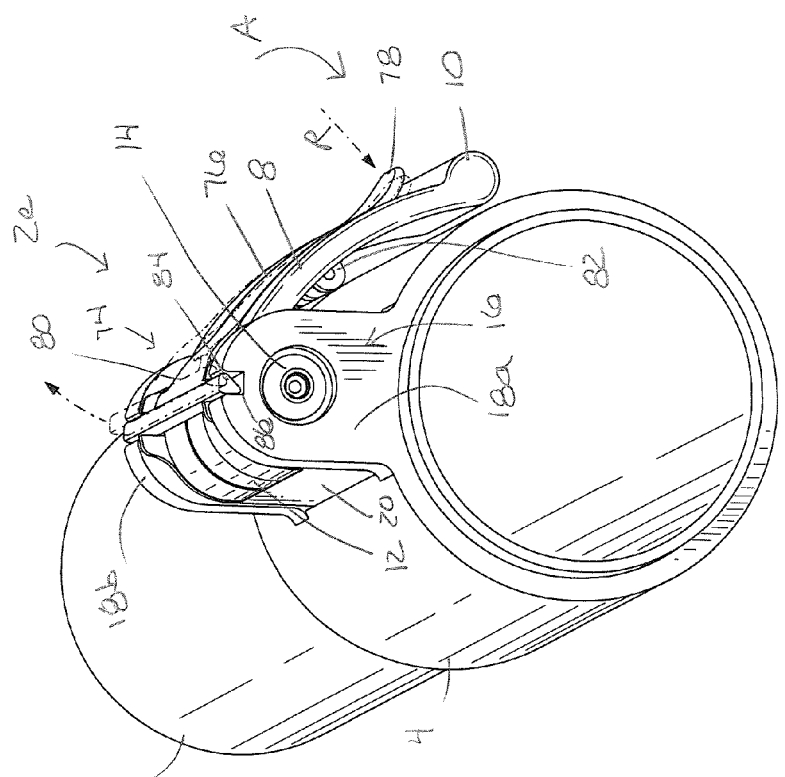
FIG. 9B is a perspective end view of the clamp shown in FIG. 9A.
Figure 9A:
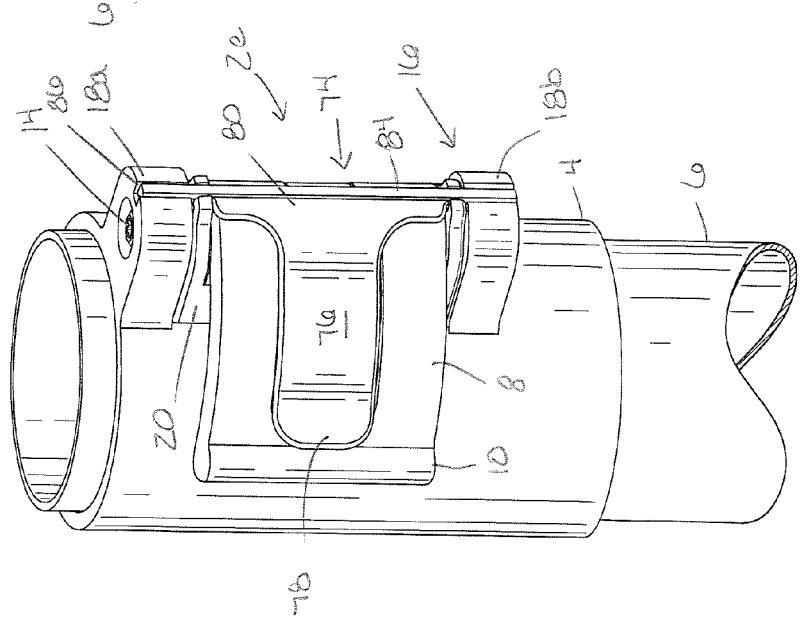
FIG. 9A is a perspective front view of another example of a clamp clamping first and second members together.
Figure 10B:
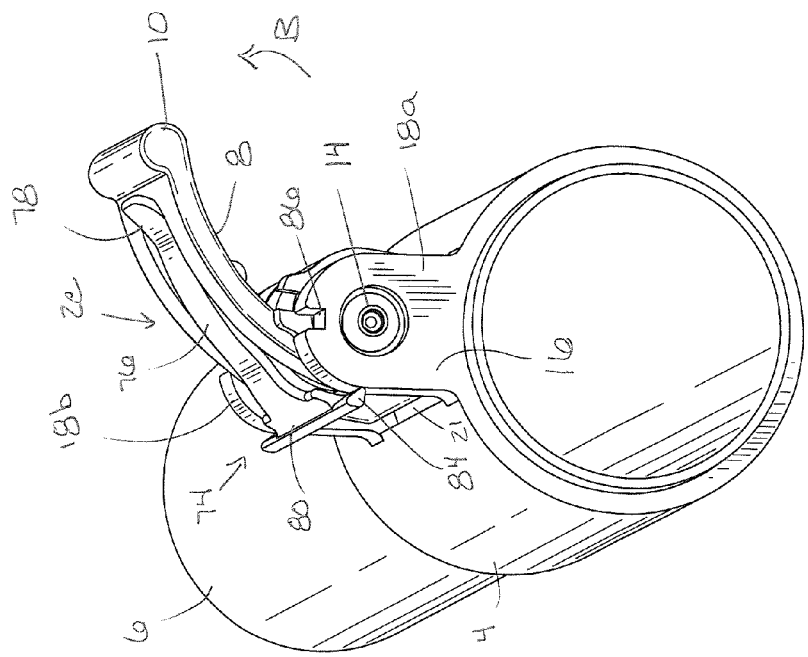
FIG. 10B is a perspective end view of the clamp shown in FIG. 1 OA.
Figure 10A:
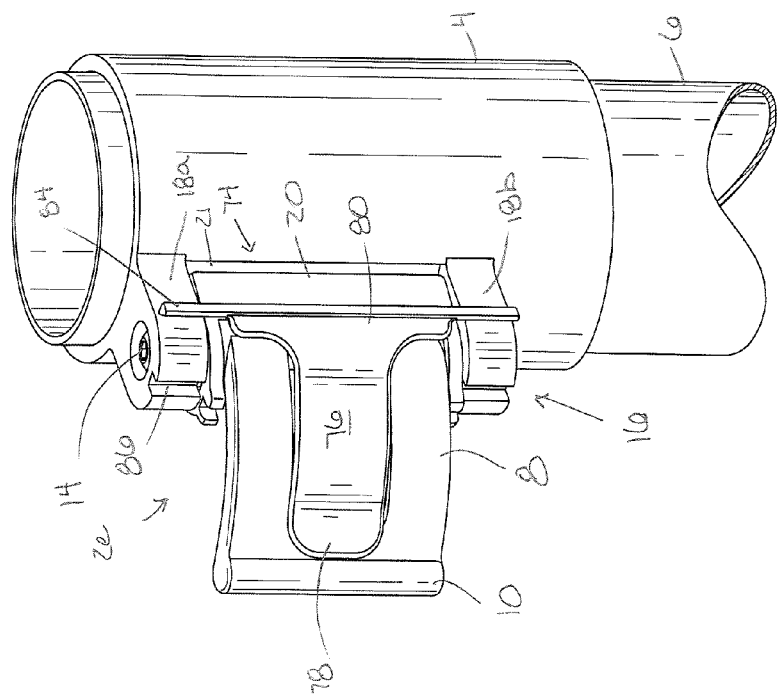
FIG. 10A is a perspective front view of the clamp shown in FIG. 9A, unclamping the first and second members.
Figure 11:
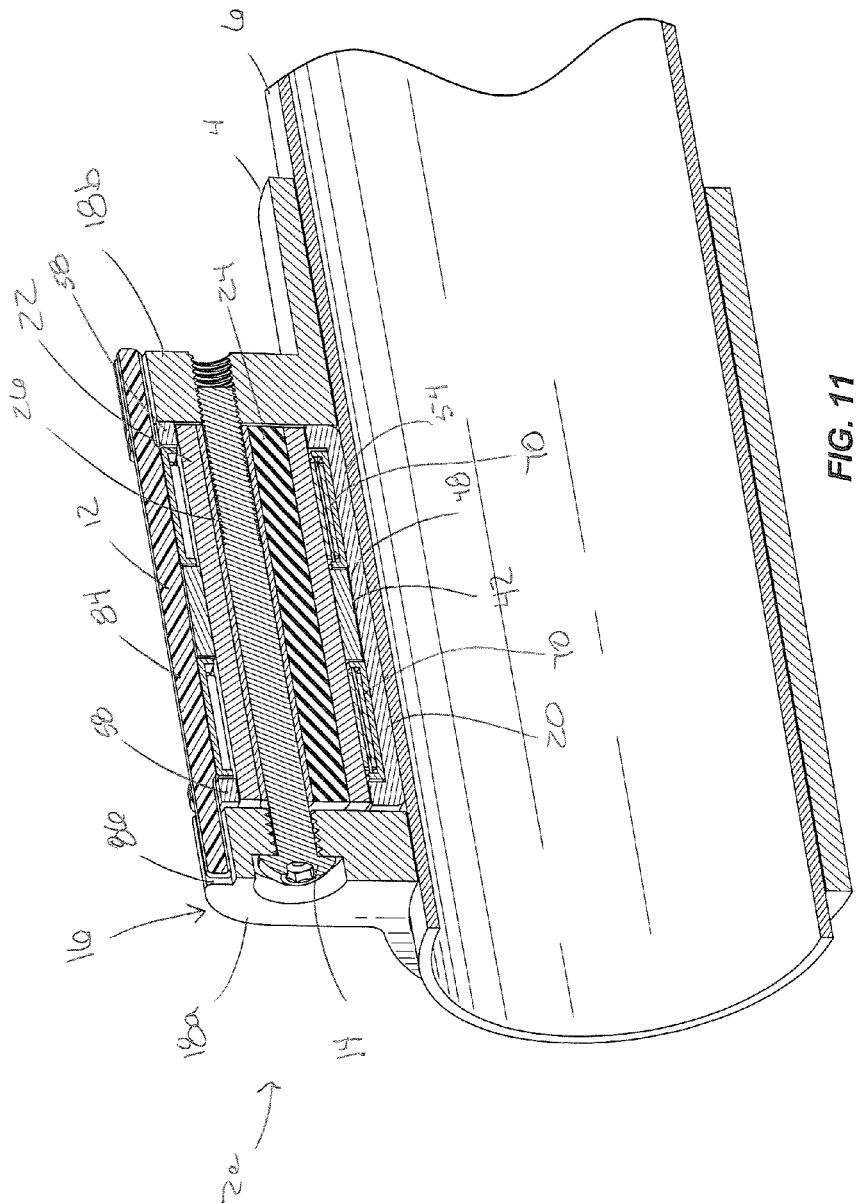
FIG. 11 is a view of section 11-11 taken in FIG. 9A.
Figure 12:
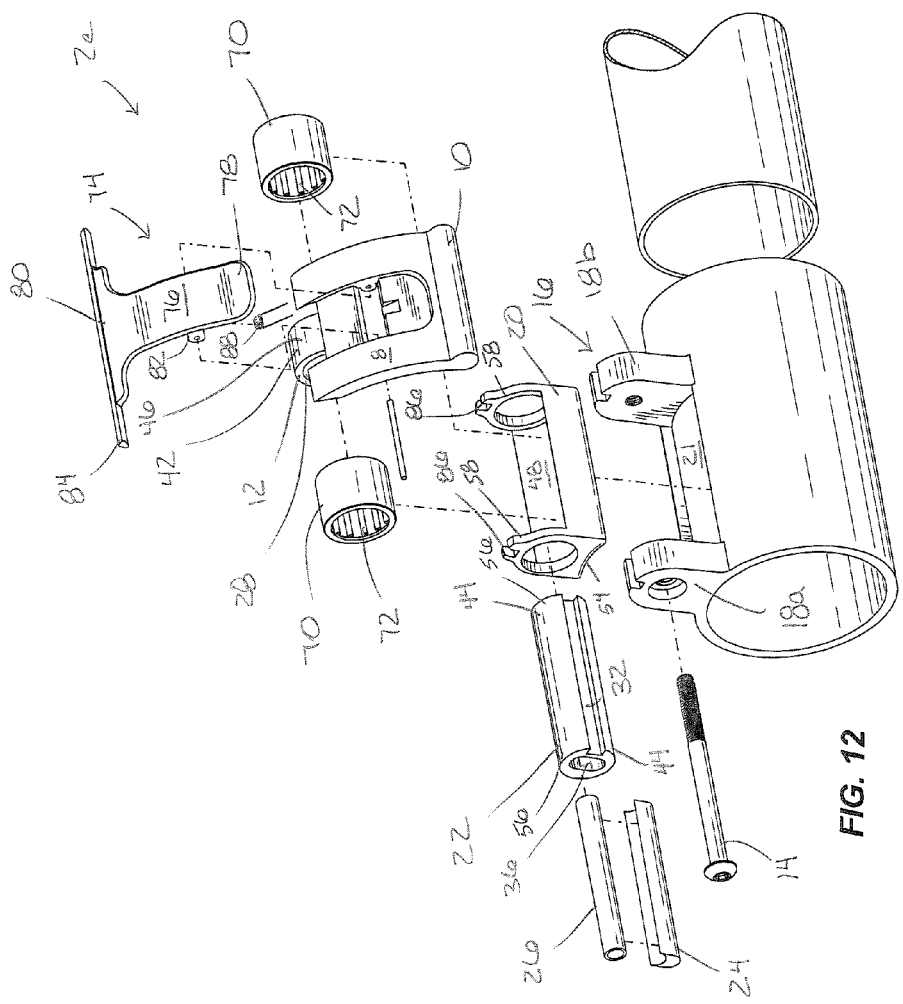
FIG. 12 is an exploded view of the clamp shown in FIG. 9A.
Figure 13:
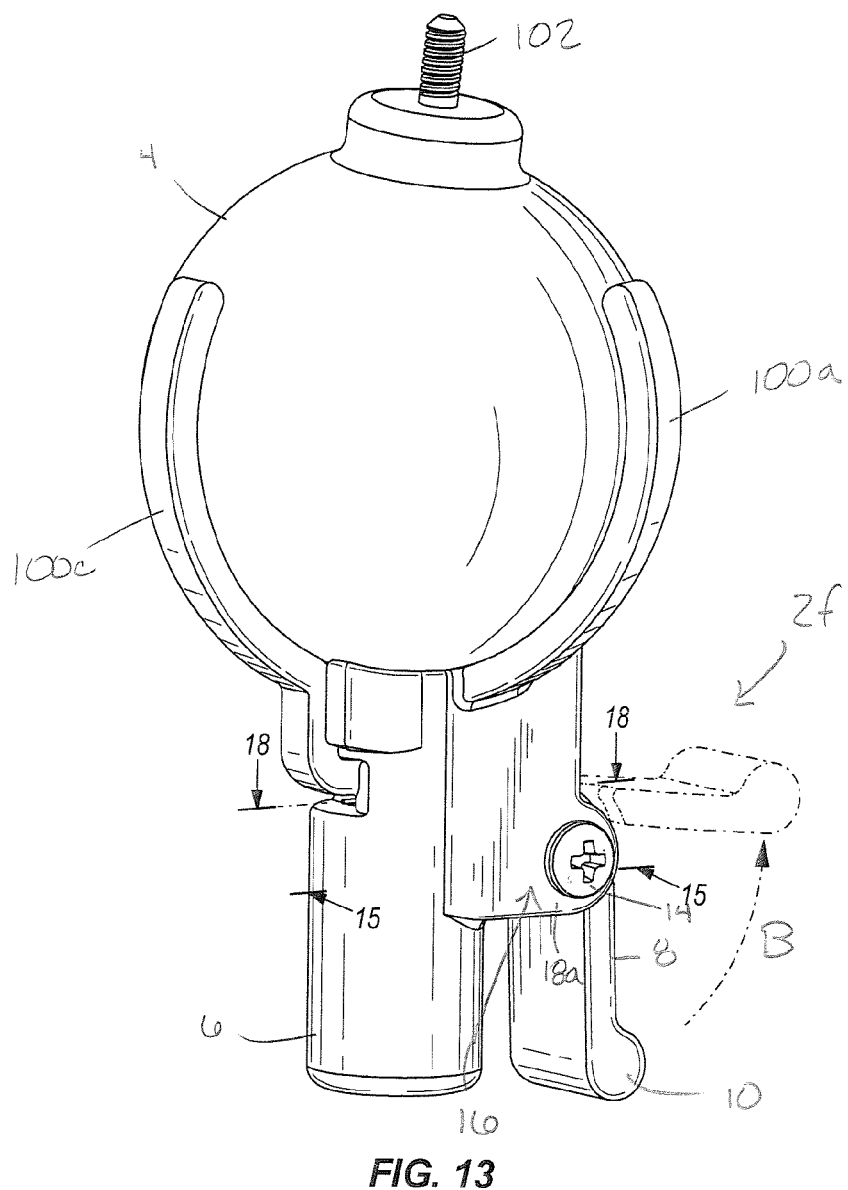
FIG. 13 is perspective view of another example of a clamp clamping first and second members together.
Figure 14:
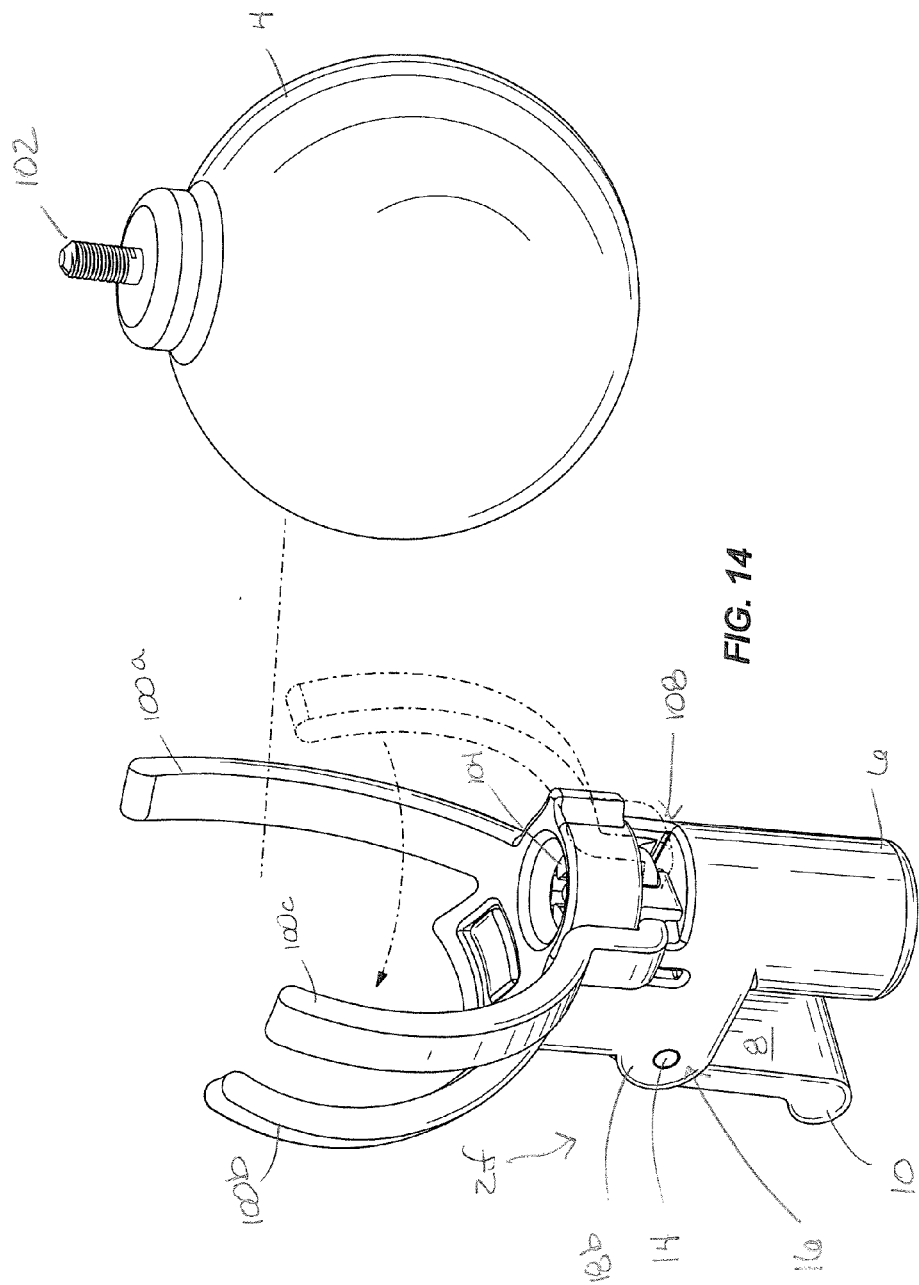
FIG. 14 is a perspective view of the second member inserted into the first member in the example of FIG. 13.
Figure 15:
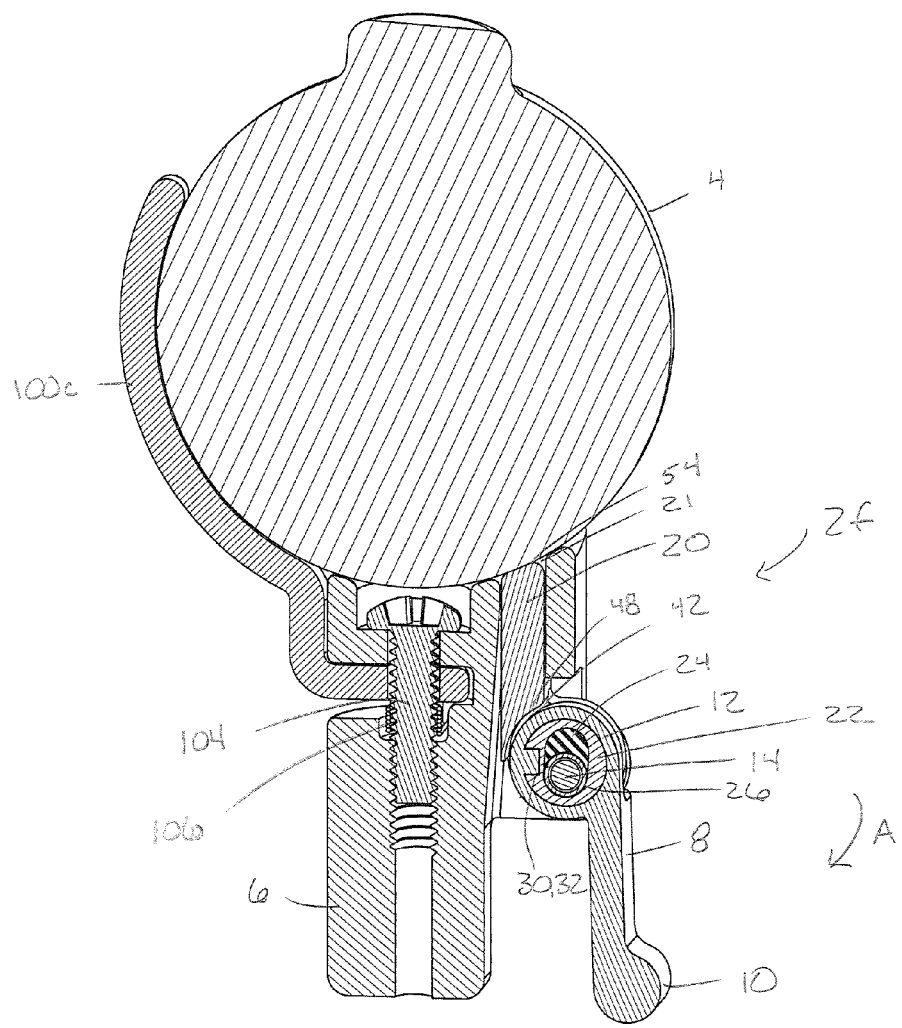
FIG. 15 is a view of section 15-15 taken in FIG. 13.
Figure 16:
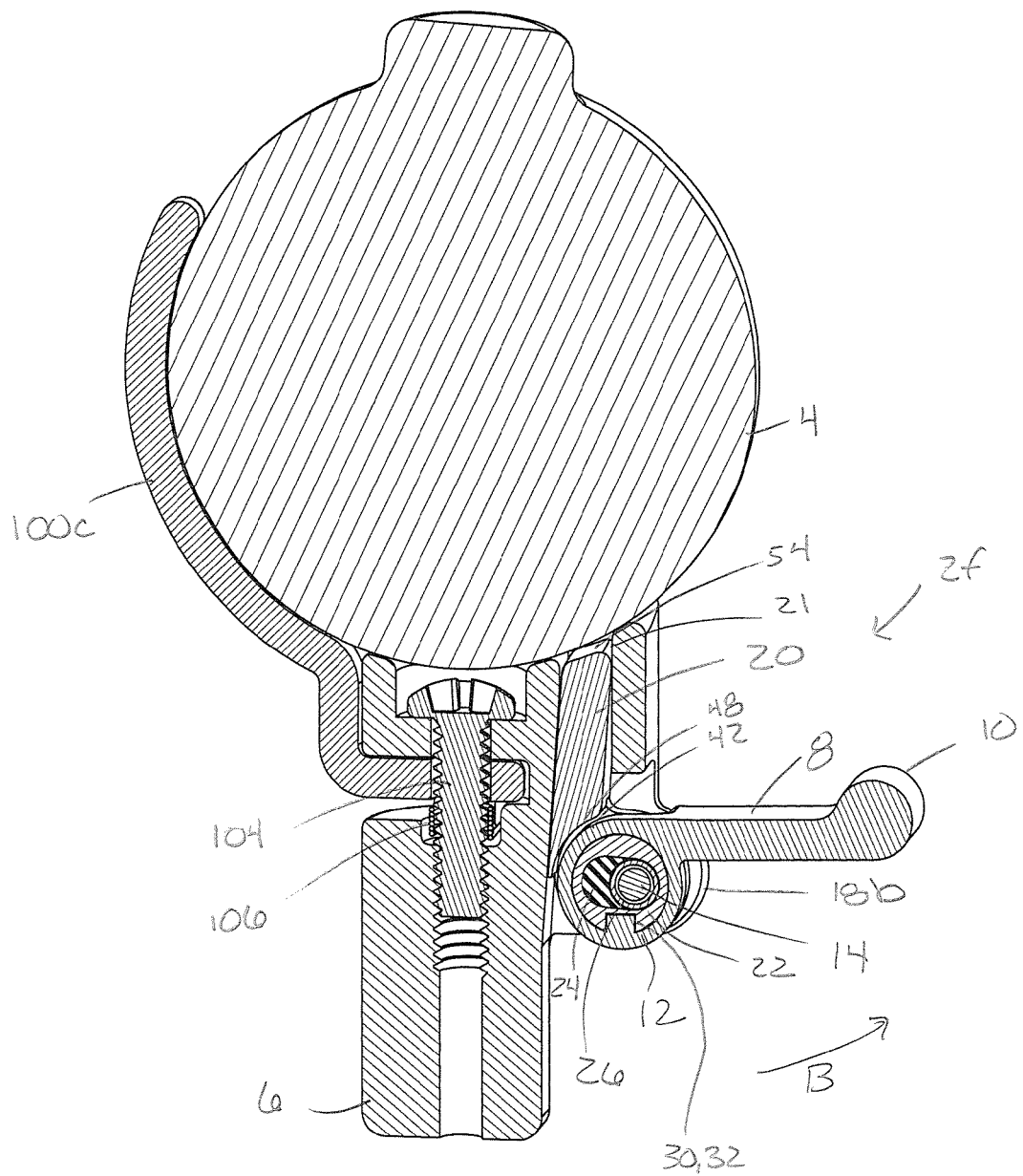
FIG. 16 is a view like FIG. 15, showing the clamp unclamping the first and second members.

Referring to FIG. 5, the clamp 2a includes the lever 8, the plunger 20, a cam cylinder 22 for engaging with the plunger 20, a resilient member 24 for providing resiliency or forgiveness to the engagement between the plunger 20 and the second member 6, and a pivot sleeve 26 through which the pivot member 14 extends. The elements shown in FIG. 5, including the lever 8, cam cylinder 22 and pivot sleeve 26 are separate components that are assembled according to the dashed lines shown in the figure; however it will be understood that these elements could instead be formed as a single component. For example, the lever 8 and cam cylinder 22 can be formed from a single stock of material. In the example shown, the cam 12 defines a central opening 28 for receiving the cam cylinder 22, resilient member 24 and pivot sleeve 26. The cam cylinder 22 is rotationally fixed with respect to the cam 12 by a key 30 and slot 32 connection. As shown in FIGS. 4A and 4B, when the cam cylinder 26 is inserted in the opening 28, it projects axially outwardly from opposite sides of the opening 28 so as to define opposing hubs 34a, 34b. The cam cylinder 22 defines an opening 36 receiving the resilient member 24 and the pivot sleeve 26. In the example shown, the resilient member 24 is a rubber bushing; however it alternately can be formed of any other material and can have any other configuration providing a resiliency function when the plunger 20 is coupled to the second member 6 such as for example a coil spring, leaf spring and/or torsion bar. In the example shown, the resilient member 24 includes an outer surface 38 abutting the cam cylinder 22 in the opening 36 and an inner surface 40 engaging with the pivot sleeve 26. The pivot sleeve 26 has an outer diameter sized to abut the cam cylinder 22 in the opening 36 and an inner diameter sized large enough to receive and allow for rotation of the lever 8 about the pivot member 14.

The cam 12 has an outer first cam surface 42 for camming the plunger 20 towards the second member 6 when the lever 8 is rotated in the first direction A and an inner second cam surface 44 for camming the plunger 20 away from the second member 6 when the lever 8 is rotated in the second direction B. In the example shown in FIGS. 1-5, the first cam surface 42 is provided by the outer curved surface 46 of the cam 12, which is curved in shape so as to be extended radially eccentrically with respect to the rotational axis R. In other words, the outer curved surface 46 of the cam 12 is not concentric with the rotational axis R. In other words, the outer curved surface 4 defines a radius that varies with respect to the rotational axis R. The outer curved surface 46 is oriented with respect to the lever 8 and the plunger 20 such that when the lever 8 is rotated in the first direction A, the eccentric portions of the outer curved surface 46 engage with an inner cam surface 48 on the plunger 20 to function to cam or move the plunger 20 towards the second member in the direction of arrows 50, shown in FIG. 4A.

Figure 2:
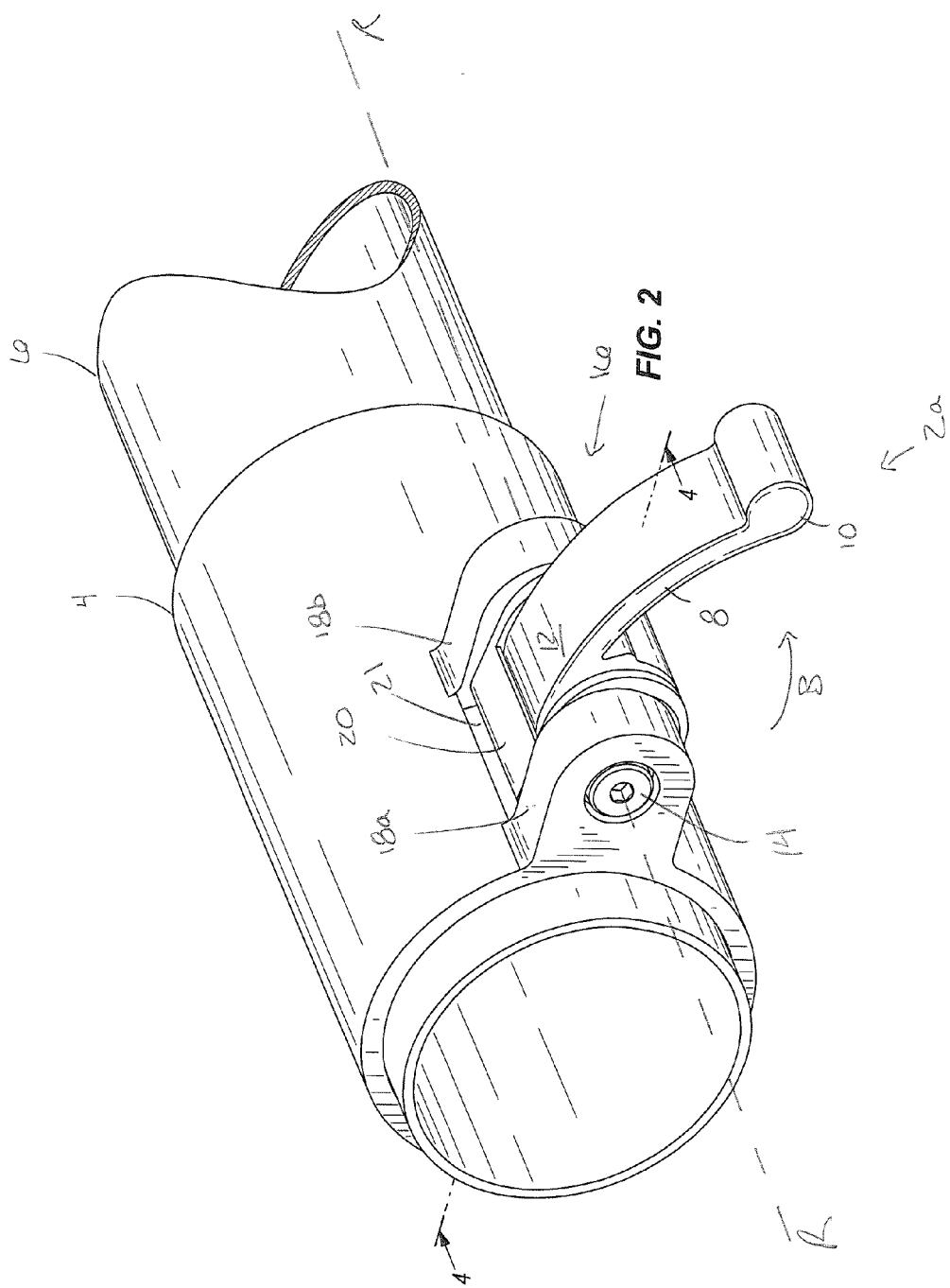
FIG. 2 is a perspective view of the clamp unclamping the first and second members.
Figure 3:
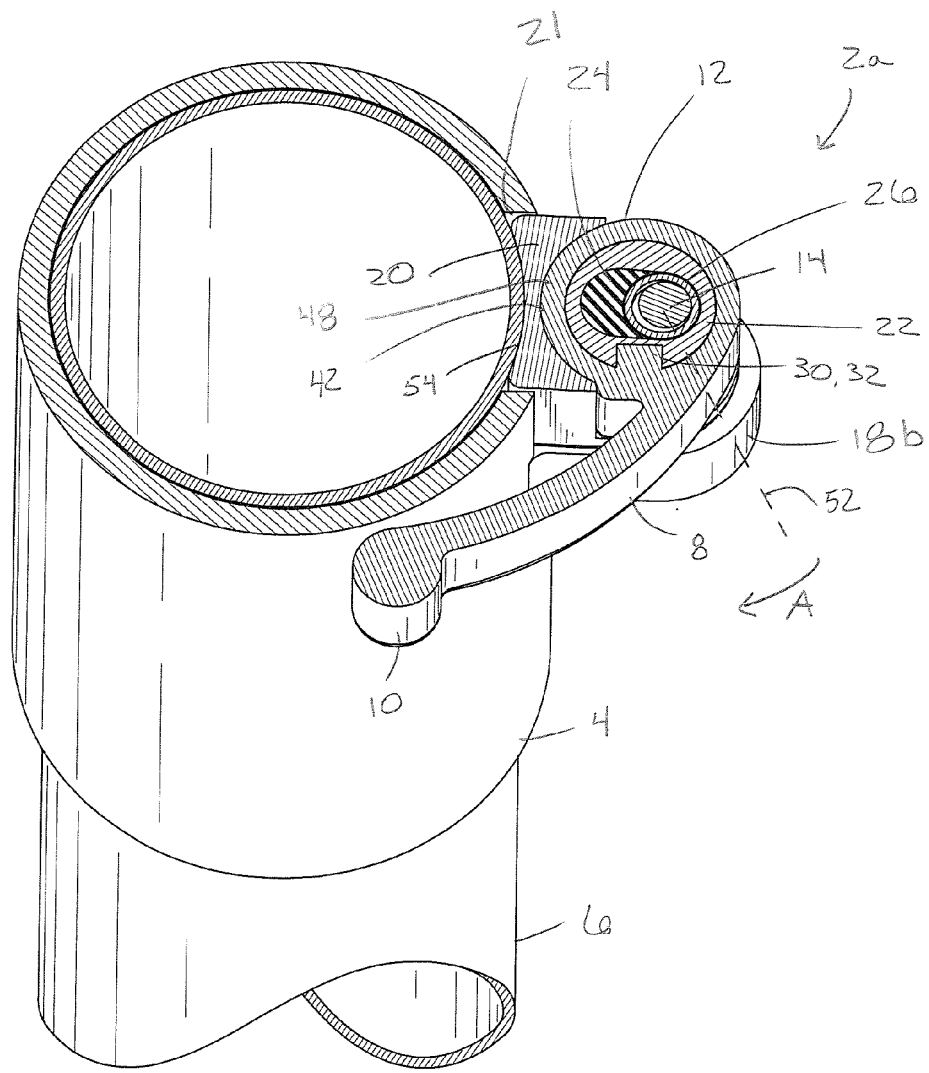
FIG. 3 is a view of section 3-3 in FIG. 1.
Figure 4:
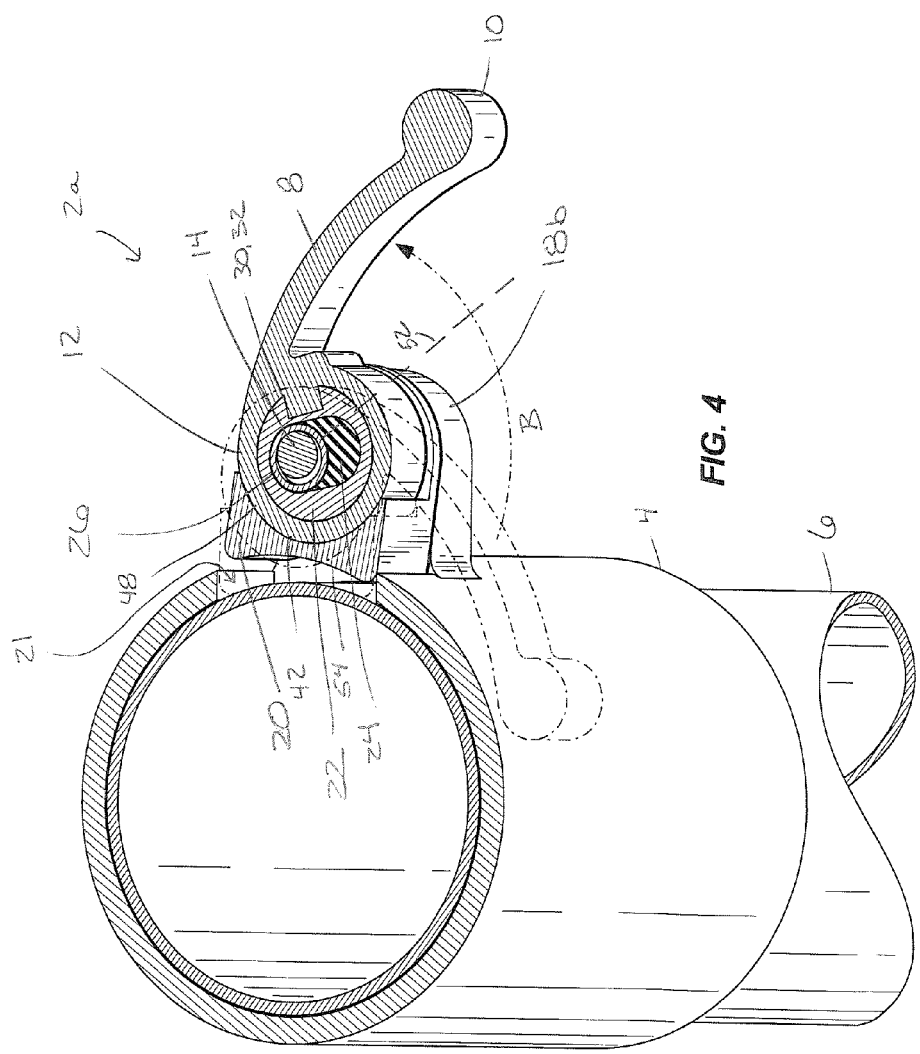
FIG. 4 is a view like FIG. 3, showing movement of a lever.

In an optional example, the outer curved surface 46 can be shaped so that an amount of torque necessary to rotate the lever 8 about the axis is greatest at an over-center rotational position, shown by axis 52 in FIGS. 3 and 4. In this example, the lever 8 is retained in position after it is rotated past the over-center rotational position 52 in the first direction A (as shown in FIG. 1) and the lever is retained in position after it is rotated past the over-center rotational position 52 in the second direction B (as shown in FIG. 2). In this example, the most severely eccentric portion of the outer curved surface 46 defines the location of the over center rotational position 52, i.e. the location where the most rotational force is required to rotate the arm 8 about the axis R.

The plunger 20 includes an outer engagement surface 54 shaped to frictionally engage with an outer surface of second member 6 such that the clamp 2 couples the first and second members 4, 6 together when the lever 8 is rotated in the first direction A, as described above. The outer engagement surface 54 can have different shapes and/or sizes depending upon the particular shape of the outer surface of the second member, some examples of which are shown in FIGS. 6A-8B. FIGS. 6A and 6B and 8A and 8B depict clamps 2b, 2d, respectively, having outer engagement surfaces 54 having V-shaped engagement surfaces for engaging a corner surface on a second member. FIGS. 2 and 3, and 7A and 7B depict clamps 2a and 2c, respectively, having concave outer engagement surfaces for engaging with cylindrical-shaped second members.

When the lever 8 is rotated in the first direction A and the plunger 20 is cammed against the second member 6, as shown in FIG. 3, the resilient member 24 is configured to resiliently bias the plunger 20 radially against the second member 6. Specifically, the resilient member 24 is disposed between the pivot sleeve 26 and the cam cylinder 22 such that radial force applied by the cam 12 against the plunger 12 is partially absorbed by the resilient member 24, depending upon the tolerance between the plunger and the second member 6. This feature allows for the clamp 2 to function with first and second members 4, 6 having a relatively larger range of design tolerances than the prior art. In other words, the resilient member 24 provides the plunger 20 with a certain amount of resilience or "give" to accommodate first and second members 4, 6 having a range of diameters within a relatively larger tolerance range.

In the examples shown in FIGS. 1-5, and particularly in FIGS. 4A and 4B, the second cam surface 44 is provided by outer hub surfaces 56 on the hubs 34a, 34b, which are also radially eccentric with respect to the rotational axis R. In other words, the outer hub surfaces 56 of the cam 12 are not concentric with the rotational axis R. The outer hub surfaces 56 are oriented with respect to the lever 8 and the plunger 20 such that when the lever 8 is rotated in the first direction A, the eccentric portions of the outer hub surfaces 56 cammingly engage with inner surfaces of retaining rings 58 on the plunger 20 to thereby cam or move the plunger 20 away from the second member 6, as shown by arrows 60 in FIG. 4B. As the lever 8 is rotated in the second direction B, the eccentric outer curved surface 46 rotates away from the inner cam surface 48, thus freeing the plunger 20 to move in the direction of arrows 60, as such movement is caused by engagement between the outer hub surfaces 56 and retaining rings 58 on plunger 20.

FIGS. 9A through 12 depict another example of a clamp 2e. Like reference numbers are applied for structure that is similar to the structure described herein above with reference to FIGS. 1-5. The example shown in FIGS. 9A-12 include additional optional features including bearings and a lock mechanism for use in heavy duty applications, such as for connecting clamping an end nut to a weight bar retaining weights for weightlifting. The example of FIGS. 9A-12 can similarly be applied to other applications.

In applications wherein increased clamping force is desired, it is possible to shape the cam 12 and plunger 20 such that a relatively large amount rotational torque is required to rotate the lever 8 past the over-center rotational position 52 in at least the first direction A. This can be accomplished by increasing the severity of the eccentric relationship between the first and second cam surfaces 42, 44 and the axis R. When properly shaped, it can be ensured that the clamp 2 remains in a closed position, despite counteracting forces, such as for example a weight bar being dropped. However in these instances, the inventor has found it also to be desirable to allow for manual operation of the clamp 2. To accommodate this situation, referring to FIG. 12, the inventor has inserted a pair of bearings 70 on either side of the cam 12. In this example, the cam cylinder 12, which as described above is rotationally fixed with respect to the cam 12, is received in and rotates in the bearings 70. The bearings 70 advantageously lessen the rotational torque necessary to rotate the cam cylinder 22 in the first direction, thus allowing for a stronger clamping force to be manually applied. Optionally the bearings 70 can also include a plurality of rotatable pins 72 on which the outer surface of the cam cylinder 22 rotates.

The example of FIGS. 9A-12 also includes a lock 74 rotationally locking the lever 8 with respect to the rotational axis R. The lock 74 includes a pivotable tongue 76 having a first end 78 and a second end 80. A pivot joint 82 is located between the first end 78 and second end 80. The pivotable tongue 76 is pivotable between a locked position shown in FIGS. 9A and 9B and in unlocked position shown in FIGS. 10A and 10B. The first end 78 of the pivotable tongue 76 has an engagement finger 84 for engaging a recess 86 on the first member 4 when the pivotable tongue 76 is in the locked position shown in FIGS. 9A and 9B. In the examples shown, the recess 86 is formed in the supporting members 18 of the clevis 16. In use, manual application of pressure on the second end 80 of the pivotable tongue 76 causes the tongue 76 to pivot about the pivot joint 82 such that the finger 84 disengages from the recess 86 and the tongue 76 is moved into the unlocked position shown in FIGS. 10A and 10B, thus allowing for pivoting of the lever 8 in the second direction B. The pivotable tongue 76 is biased into the locked position by a spring 88 such that when the lever 8 is pivoted about the axis R into the position shown in FIGS. 9A and 9B, the engagement finger 84 is biased into the recess 86, thus snap-engaging therewith and automatically locking the lever 8 from further movement about axis R.

FIGS. 13-18 depict another example of a clamp 2f. Like reference numbers are applied for structure that is similar to the structure described herein above with reference to FIGS. 1-5. The examples shown in FIGS. 13-18 include additional optional features including alternate configurations of the first and second members 4, 6 for use in applications wherein the second member 6 comprises a pivotable member that is pivotable with respect to the first member 4. This example can be used in tripod mounts for cameras, and other types of similar applications.

Figure 17:
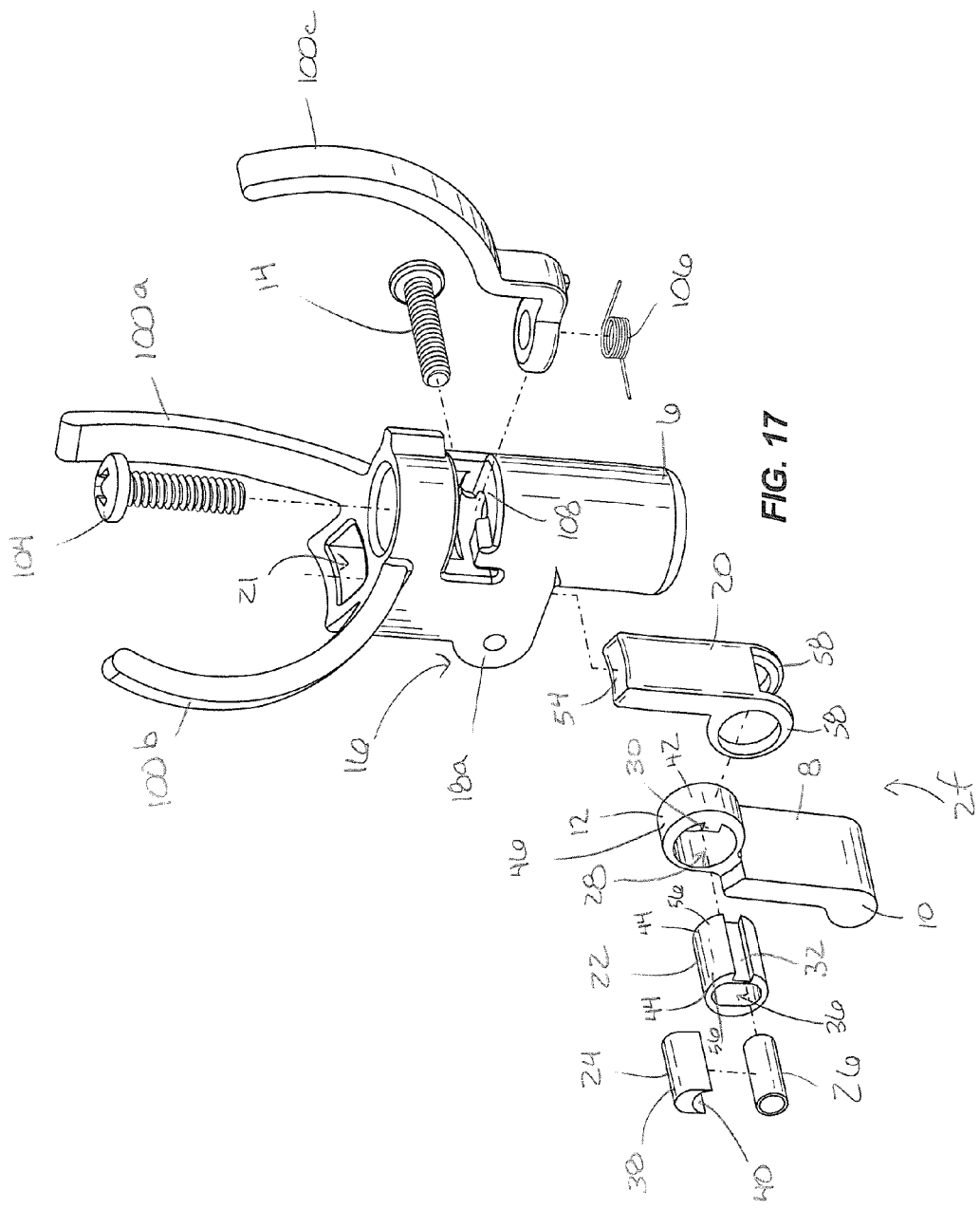
FIG. 17 is an exploded view of the clamp shown in FIG. 13.
Figure 18:
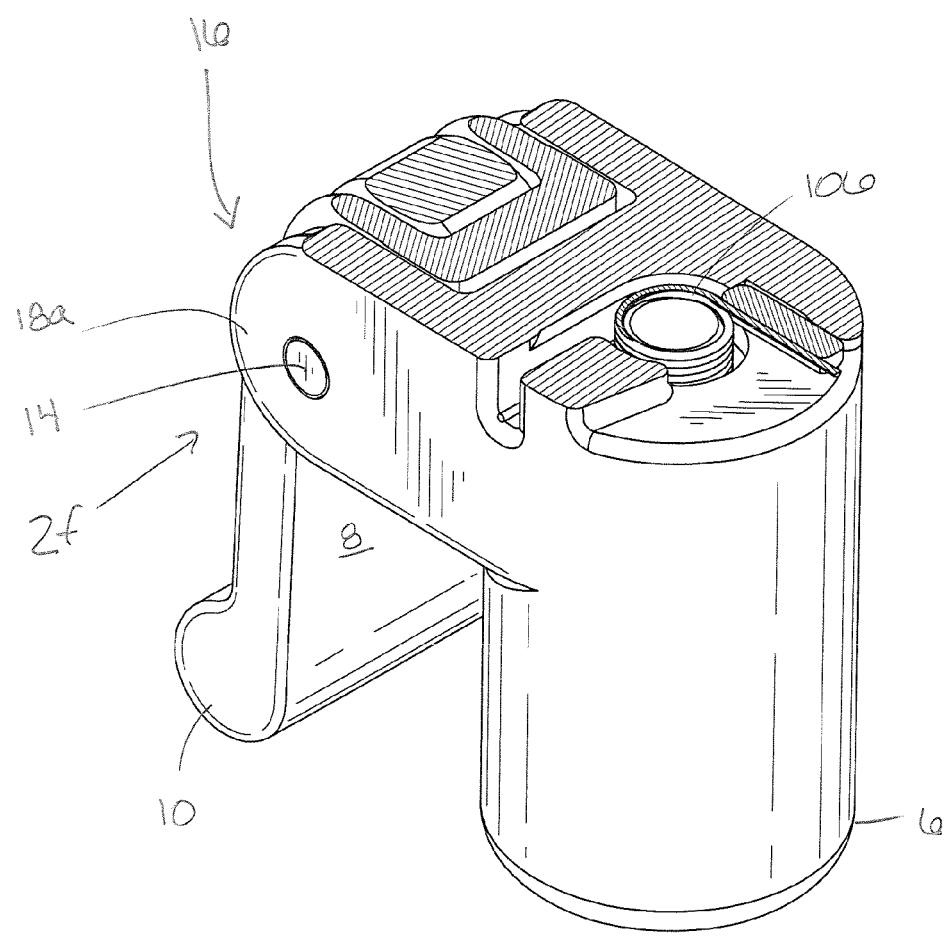
FIG. 18 is a view of section 18-18 taken in FIG. 13.
Figure 19:
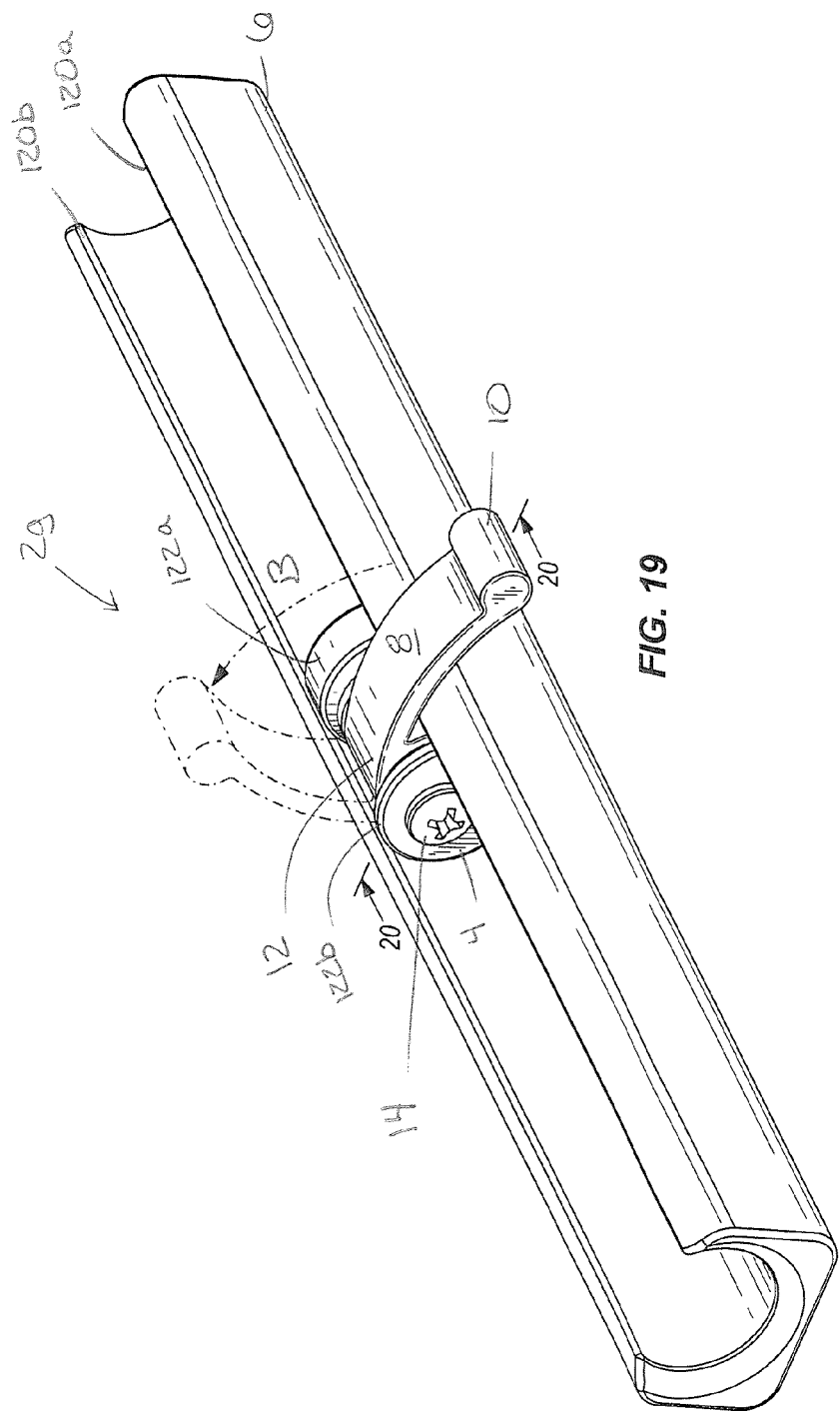
FIG. 19 is a perspective view of another example of a clamp clamping first and second members together.
Figure 20:
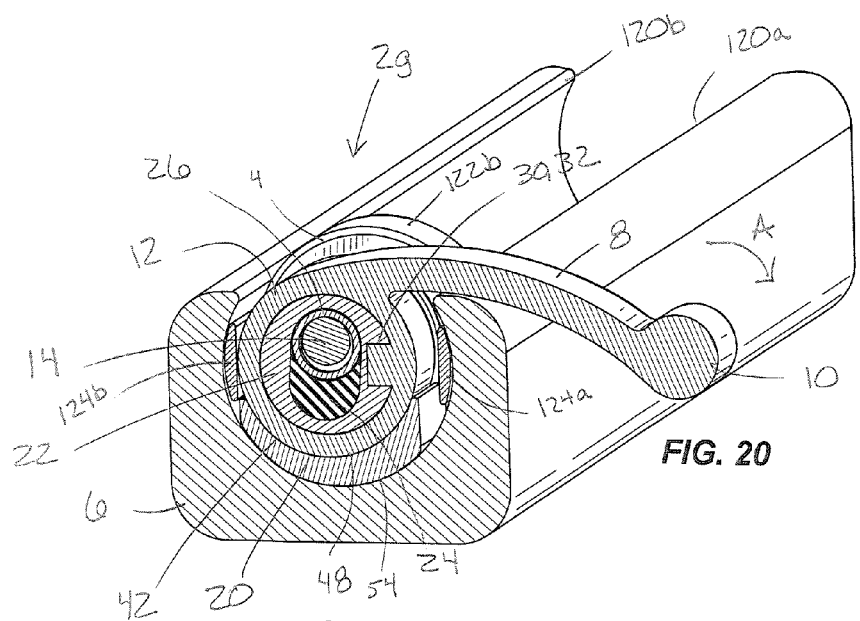
FIG. 20 is a view of section 20-20 taken in FIG. 19.
Figure 21:
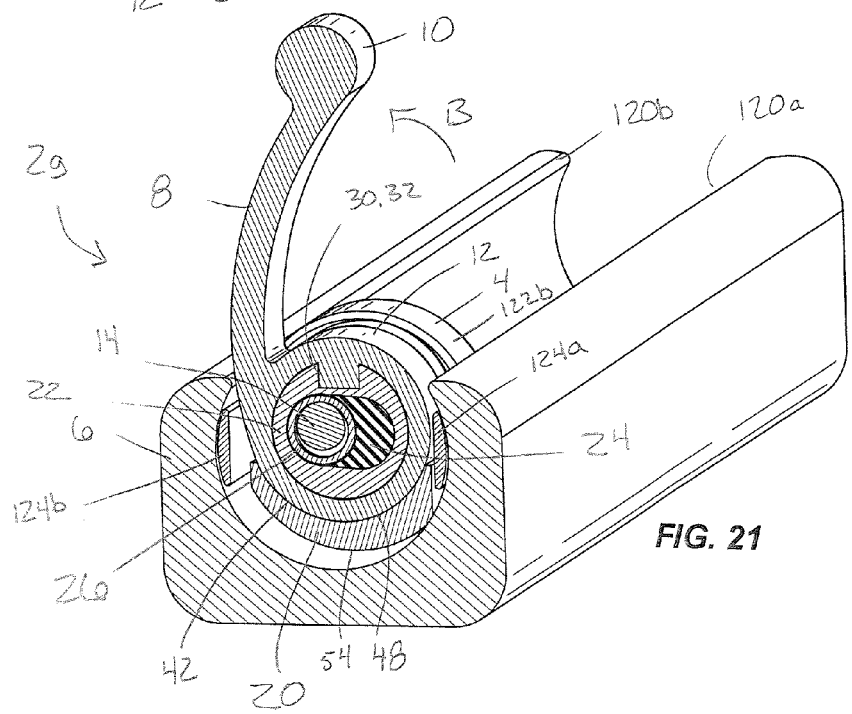
FIG. 21 is a view like FIG. 20, showing the clamp unclamping the first and second members.

Referring to FIGS. 17 and 18, the first member 4 comprises a plurality of arms 100a, 100b, 100c retaining the second member 6 with respect to the first member 4. In this example, the second member is substantially spherical and each of the arms 100a-100c is curved and long enough to retain the spherical second member 6. The spherical second member includes a mounting screw 102 for mounting a peripheral device, such as a camera. The arm 100c is laterally movable between a first position shown in FIG. 13 wherein the second member 6 is retained with respect to the first member 4 and a second position shown in FIG. 14 wherein the second member is not retained and removable from the first member 4. In this example, the arm 100c is mounted to the first member 4 by a mounting screw 104 and is laterally pivotable about the mounting screw and biased into the closed position by a spring 106. The arm 100c travels in a slot 108 formed in the first member 4. Movement of the arm 100c in the slot 108 between the opened and closed positions is governed by the edges of the slot 108. The clamp 2f includes the structures herein above with respect to FIGS. 1-5. The plunger 20 has an extended engagement surface 54 that extends through the recess 21 in the first member 4. Rotation of the arm 8 in the first direction A engages the surface 54 with the second member 6, thus preventing rotational movement of the second member 6 with respect to the first member 4.

Figure 22:
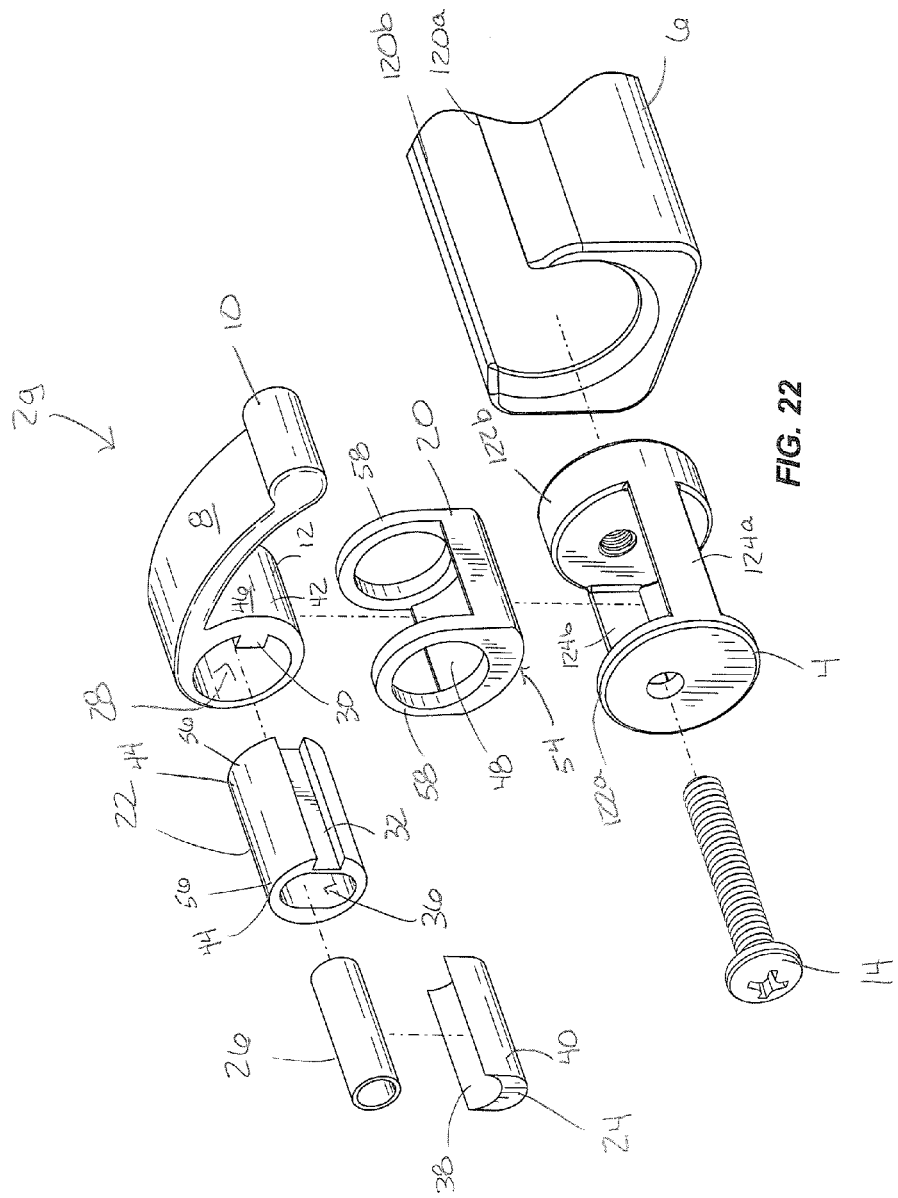
FIG. 22 is an exploded view of the clamp shown in FIG. 17.

FIGS. 19-22 depict another example of a clamp 2g. Like reference numbers are applied for a structure that is similar to the structure described herein above with reference to FIGS. 1-5. In the examples shown in FIGS. 19-22, alternate configurations for the first and second members 4, 6 are provided for use for example track lighting applications. Referring to FIG. 22, the first member 4 comprises a mount and the second member 6 comprises a track within which the mount 4 is slidably retained. The track 6 has a C-shaped cross section having opposing retaining ends 120a, 120b. The mount 4 includes an outer diameter that is larger than a gap G formed between the opposing retaining ends 120a, 120b and smaller than an inner diameter of the track 6. The mount 4 includes opposing end members 122a, 122b and spacers 124a, 124b extending therebetween. Rotation of the lever 8 about the axis R in the first direction A cams the plungers 20 towards the second member 6 to couple the first and second members 4, 6 together and prevent lateral sliding motion of the first member 4 with respect to the second member 6. Rotation of the lever 8 about the axis R in the second, opposite direction B cams the plunger 20 away from the second member 6 to uncouple the first and second members 4, 6 from each other, thus allowing lateral sliding motion of the first member 4 with respect to the second member 6.

Figure 23:
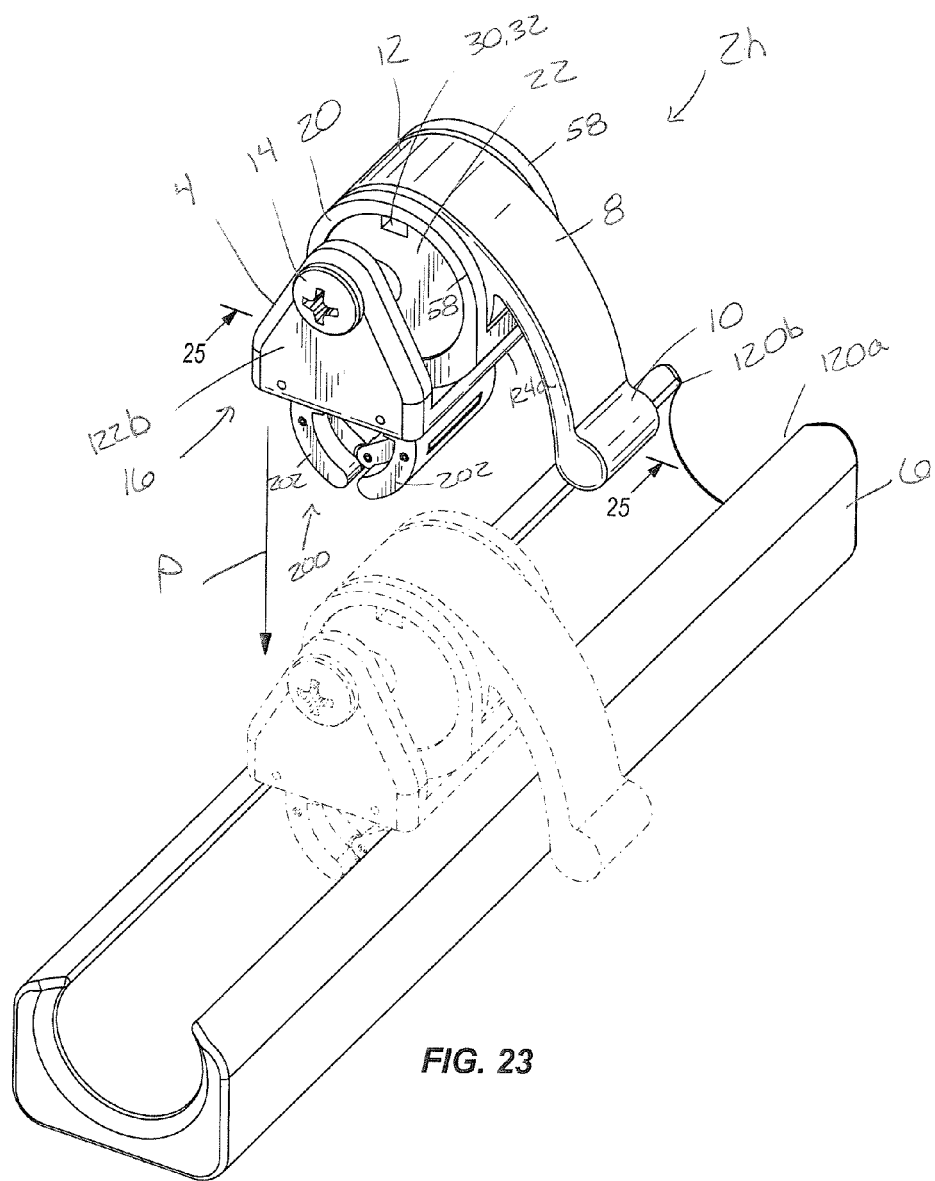
FIG. 23 is a perspective view of another example of a clamp clamping first and second members together.
Figure 24:
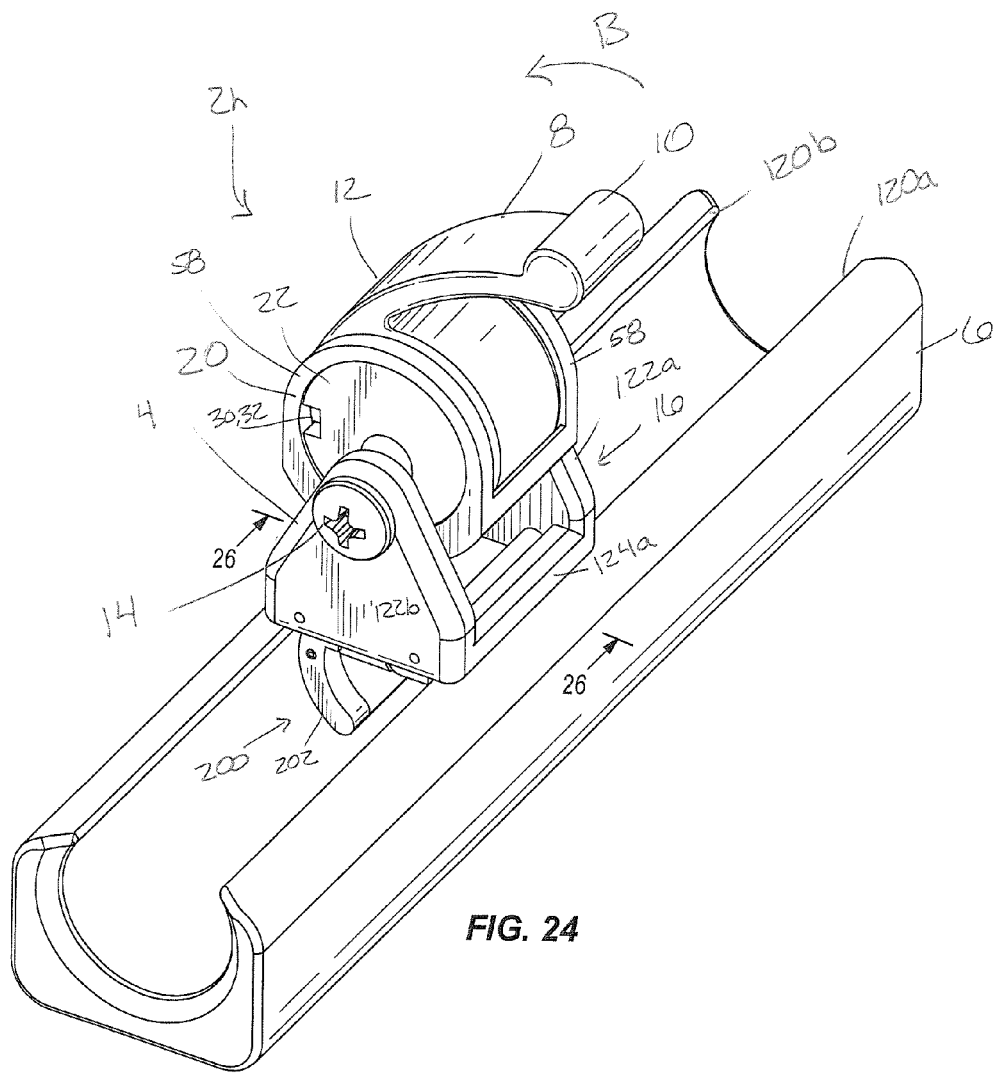
FIG. 24 is a perspective view of the clamp shown in FIG. 23.
Figure 27:
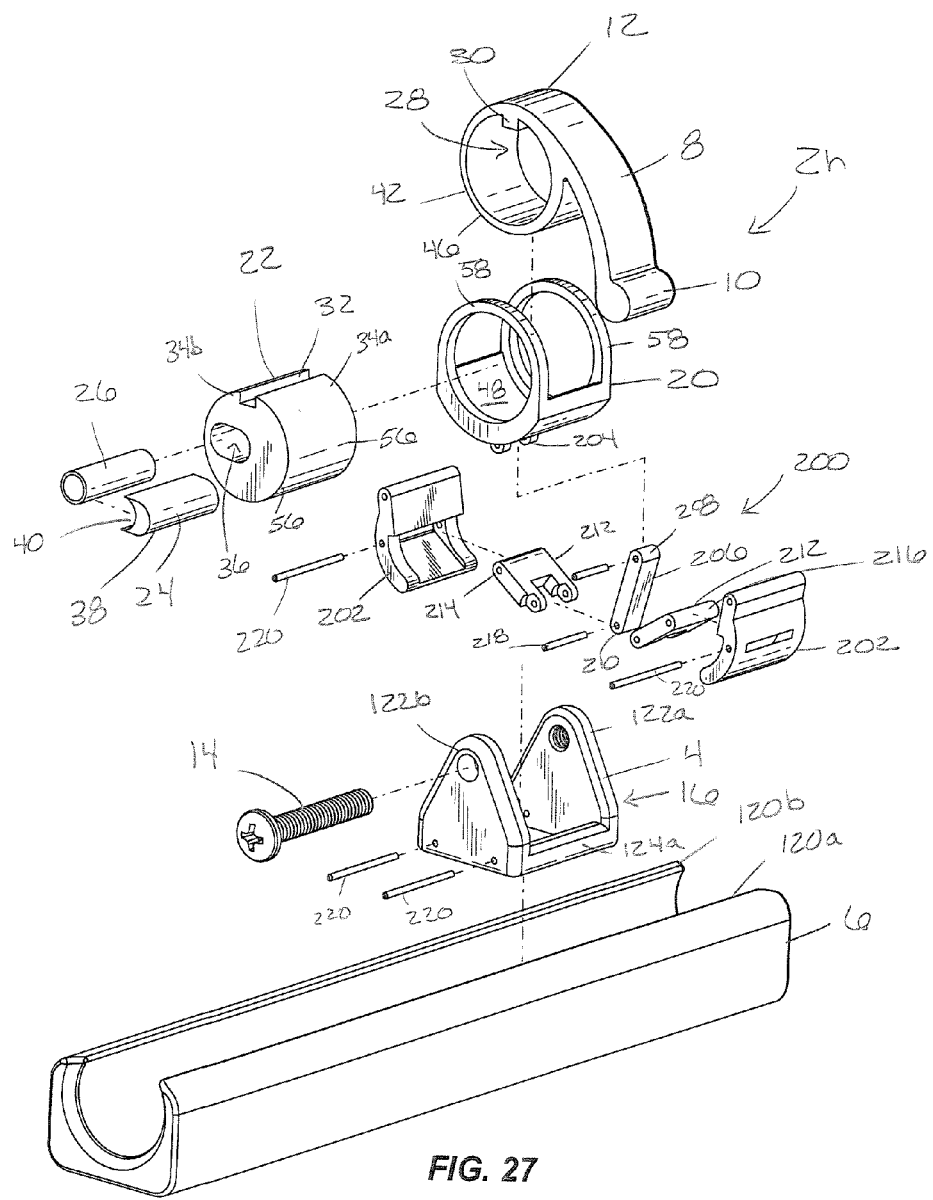
FIG. 27 is an exploded view of the clamp shown in FIG. 23.

FIGS. 23-27 depict another example of a clamp 2h. Like reference numbers are applied for a structure that is similar to the structure described herein above with reference to FIGS. 1-5 and FIGS. 19-22. Referring to FIG. 27, the first member 4 includes a mount having opposing end members 122a, 122b and spacers 124a, 124b similar to the embodiment shown in FIGS. 19-22. The second member 6 includes the track having a C-shaped cross section and the opposing retaining ends 120a, 120b, similar to the example in FIGS. 19-22. The mount 4 is sized larger than the gap G formed between the opposing retaining ends 120a, 120b such that the mount 4 rests on top of the track 6, as shown in FIG. 24. Actuation of the plunger 20 actuates a linkage 200 having locking arms 202 for engaging with the interior of the second member 6 to couple the first member 4 to the second member 6. Specifically, rotation of the lever 8 about the pivot member 14 in the first direction A shown in FIG. 25 causes the locking arms 202 to move out of engagement with the second member 6, to thereby uncouple the first and second members 4, 6. Rotation of the lever 8 in the first direction A also allows the first member 4, including the linkage 200 to be inserted onto the second member 6 such that the linkage 200 is disposed in the second member 6, as shown in FIG. 23 at arrow P. Once the linkage 200 is disposed in the track of the second member 6, rotation of the lever 8 in the second, opposite direction B causes the locking arms 202 to move into engagement with the interior of second member 6 to couple the first and second members 4, 6 together.

Figure 25:
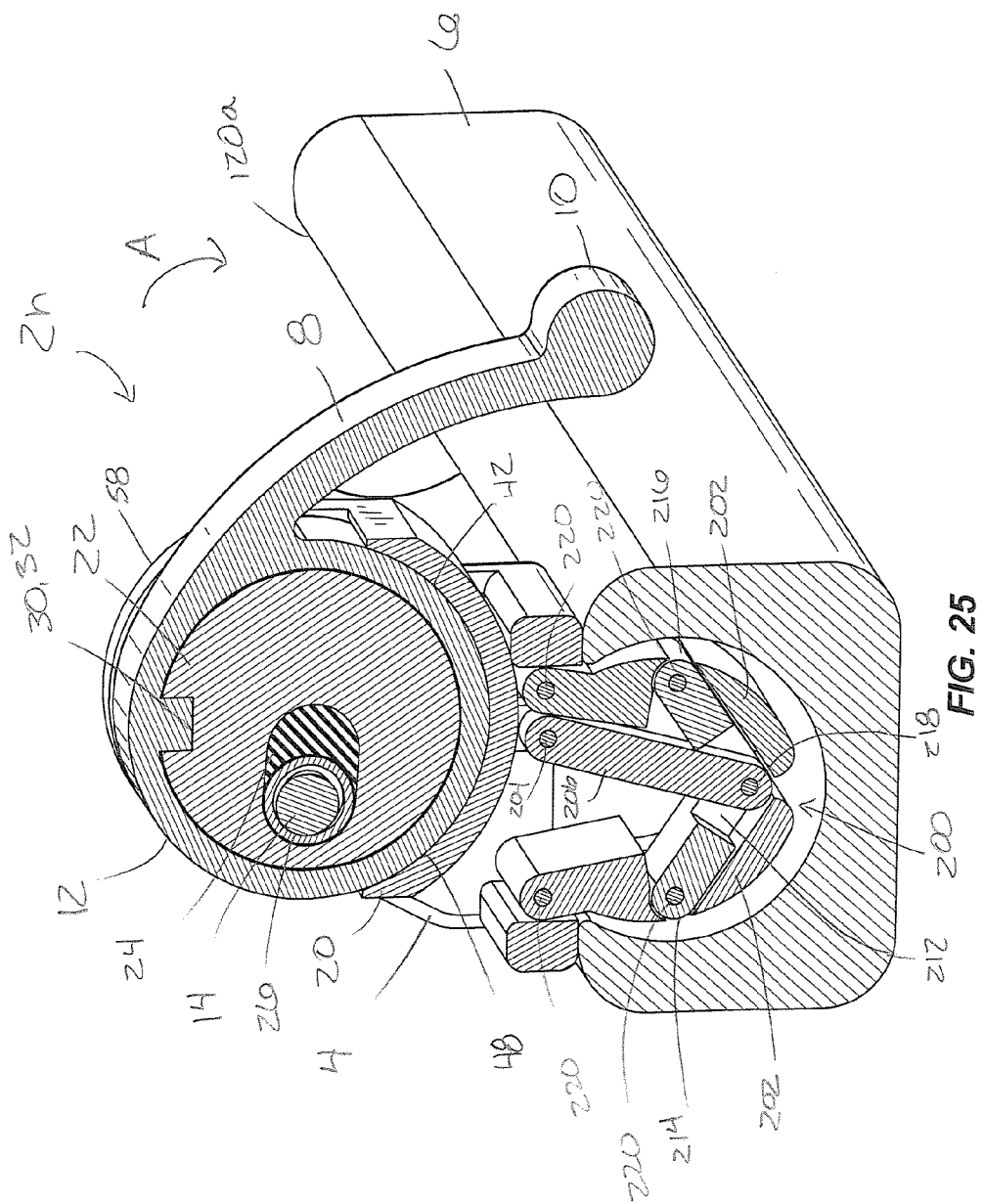
FIG. 25 is a view of section 26-26 taken in FIG. 24, showing the clamp unclamping the first and second members.
Figure 26:
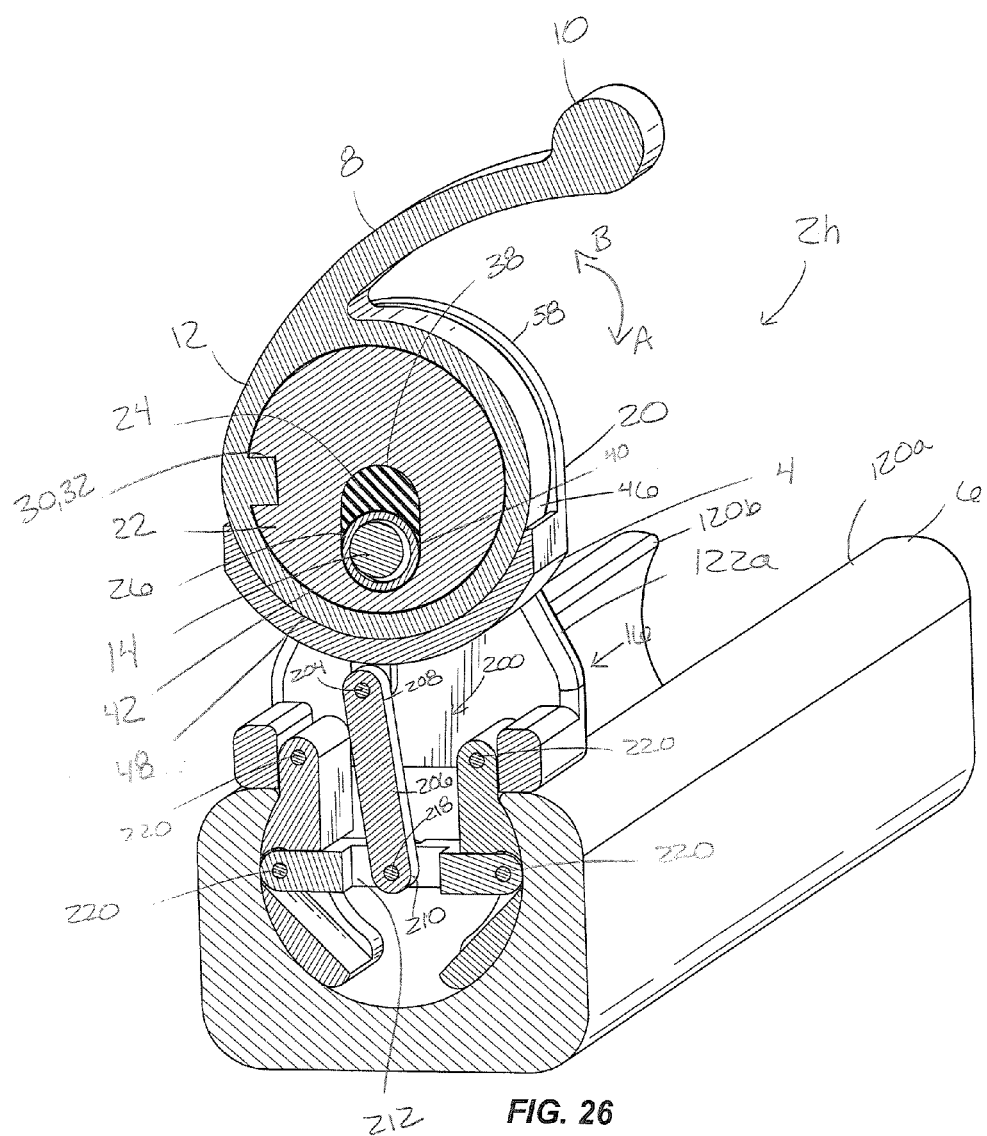
FIG. 26 is a view like FIG. 25, showing the clamp clamping the first and second members together.

In the examples shown, the linkage 200 is rotatably coupled to the plunger at a pivot 204. The linkage 200 includes a pivot bar 206 having a first end 208 pivotably coupled to the plunger 20 at a pivot 204 and a second end 210 pivotably coupled to a cross bar 212. The cross bar 212 has opposing ends 214, 216 pivotably coupled to the locking arms 202. The cross bar 212 pivots about a pivot pin 218 located between the opposing ends 214, 216. As shown in FIG. 25, rotation of the lever 8 in the direction A causes the plunger 20 to move the pivot 204 downwardly and laterally so as to move the pivot bar 206 downwardly and the first end 208 of the pivot bar 206 laterally. This movement causes the cross bar 212 to move downwardly and pivot about pivot point 218 and force the locking arms 202 to fold and pivot inwardly away from the inner surfaces of the second member 6. Opposite rotation of the lever 8 in the direction B moves the pivot point 204 oppositely, thus forcing the locking arms 202 outwardly into the position shown in FIG. 26. Locking arms 202 are pivotably connected by pivot pins 220.

What is claimed is:

1. A clamp for clamping a first member to a second member, the clamp comprising:
   a lever that is rotatably coupled to the first member, the lever comprising a handle and a cam that rotate together about a rotational axis; and
   a plunger;
   wherein rotation of the lever about the axis in a first direction cams the plunger towards the second member to couple the first and second members together and wherein rotation of the lever about the axis in a second, opposite direction cams the plunger away from the second member to uncouple the first and second members from each other;
   wherein the cam comprises a first cam surface camming the plunger towards the second member when the lever is rotated in the first direction and a second cam surface camming the plunger away from the second member when the lever is rotated in the second direction;
   wherein the first cam surface comprises an outer curved surface that is radially eccentric with respect to the rotational axis;
   wherein the outer curved surface is shaped so that an amount of torque necessary to rotate the lever about the axis is greatest at an over-center rotational position, such that the lever is retained in position after it is rotated past the over-center rotational position in the first direction and such that the lever is retained in position after it is oppositely rotated past the over-center rotational position in the second direction;
   wherein the plunger comprises an inner cam surface that is cammingly engaged by the eccentric outer curved surface of the first cam surface when the lever is rotated in the first direction to thereby move the plunger towards the second member;
   wherein the second cam surface comprises outer surfaces on opposite sides of the inner cam surface, the outer surfaces being radially eccentric with respect to the rotational axis;
   wherein the plunger further comprises opposing retaining rings that are cammingly engaged by the outer surfaces of the second cam surface when the lever is rotated in the second direction to thereby move the plunger away from the second member; and
   wherein the retaining rings are spaced apart from each other so that the lever can rotate between the retaining about the rotational axis and past the over-center rotational position in the first and second directions.

2. A clamp according to claim 1, wherein the outer surfaces of the second cam surface comprise ends of a cam cylinder extending from the cam.

3. A clamp according to claim 2, comprising at least one bearing in which the cam cylinder rotates.

4. A clamp according to claim 3, wherein the at least one bearing comprises a plurality of rotatable pins on which the cam cylinder rotates.

5. A clamp according to claim 1, comprising a resilient member resiliently biasing the plunger against the second member when the lever is rotated in the first direction.

6. A clamp according to claim 5, wherein the resilient member is disposed inside the cam.

7. A clamp according to claim 6, wherein the resilient member comprises a bushing.

8. A clamp according to claim 5, comprising a pivot sleeve and a cam cylinder in the cam, wherein the resilient member is disposed in the cam between the pivot sleeve and the cam cylinder.

9. A clamp according to claim 1, comprising a pivot member about which the lever rotates.

10. A clamp according to claim 9, wherein comprising a clevis connecting the pivot member to the first member.

11. A clamp according to claim 10, comprising a pivot sleeve through which the pivot member extends.

12. A clamp according to claim 1, wherein the plunger comprises a concave engagement surface for engaging a cylindrical-shaped second member.

13. A clamp according to claim 1, wherein the plunger comprises a V-shaped engagement surface for engaging a corner surface on a second member.

14. A clamp according to claim 1, comprising a lock rotationally locking the lever with respect to the axis.

15. A clamp according to claim 14, wherein the lock comprises a pivotable tongue having a first end and a second end and a pivot joint located there between and being pivotable between a locked position and an unlocked position.

16. A clamp according to claim 15, wherein the first end of the pivotable tongue has an engagement finger for engaging a recess on the first member when the pivotable tongue is in the locked position.

17. A clamp according to claim 16, wherein application of pressure on the second end of the pivotable tongue causes the tongue to pivot about the pivot joint such that the finger disengages from the recess and the tongue is moved into the unlocked position.

18. A clamp according to claim 17, wherein the pivot joint extends through the lever.

19. A clamp according to claim 1, comprising the first and second members, wherein the second member is pivotable with respect to the first member, wherein rotation of the lever in the first direction prevents pivoting of the second member and wherein rotation of the lever in the second, opposite direction allows pivoting of the second member.

20. A clamp according to claim 19, wherein the first member comprises a plurality of arms retaining the second member with respect to the first member.

21. A clamp according to claim 20, wherein the second member is substantially spherical and each of the plurality of arms is long enough to retain the spherical second member.

22. A clamp according to claim 21, comprising a screw extending from the second member for mounting a peripheral device.

23. A clamp according to claim 22, therein at least one of the plurality of arms is movable between a first position wherein the second member is retained with respect to the first member and a second position wherein the second member is not retained with respect to the first member.

24. A clamp according to claim 23, comprising a spring biasing the movable arm into the first position.

25. A clamp according to claim 1, comprising the first and second members, wherein the first member comprises a mount and the second member comprises a track within which the mount is slidably retained.

26. A clamp according to claim 25, wherein the track comprises a C-shaped cross-section having opposing retaining ends.

27. A clamp according to claim 26, wherein the mount comprises an outer diameter that is larger than a gap formed between the opposing retaining ends and smaller than an inner diameter of the track.

28. A clamp according to claim 27, wherein the mount comprises opposing end members and at least one spacer extending there between.

29. A clamp according to claim 25, wherein the plunger comprises a linkage and locking arms, and wherein the linkage couples the plunger to the locking arms.

30. A clamp according to claim 29, wherein rotation of the lever about the pivot member in the first direction causes the linkage to move the locking arms into engagement with the track to couple the first and second members together and wherein rotation of the lever in the second, opposite direction causes the linkage moves the locking arms out of engagement with the track to uncouple the first and second members.

31. A clamp according to claim 30, wherein the linkage is rotatably coupled to the cam.

32. A clamp according to claim 31, wherein the linkage comprises a pivot bar having a first end coupled to the cam and a second end coupled to a cross bar, wherein the cross bar has opposing ends coupled to the locking arms.

33. A clamp according to claim 32, wherein the cross bar pivots about pivot located between its opposing ends.

34. A clamp for clamping a first member to a second member, the clamp comprising;
 a lever that is rotatably coupled to the first member, the lever comprising a handle and a cam that rotate together about a rotational axis; and
 a plunger;
 wherein rotation of the lever about the axis in a first direction cams the plunger towards the second member to couple the first and second members together and wherein rotation of the lever about the axis in a second, opposite direction cams the plunger away from the second member to uncouple the first and second members from each other;
 further comprising the first and second members, wherein the second member is pivotable with respect to the first member, wherein rotation of the lever in the first direction prevents pivoting, of the second member and wherein rotation of the lever in the second, opposite direction allows pivoting of the second member;
 wherein the first member comprises a plurality of arms retaining the second member with respect to the first member;
 wherein the second member is substantially spherical and each of the plurality of arms is long enough to retain the spherical second member;
 a screw extending from the second member for mounting a peripheral device;
 wherein at least one of the plurality of arms is movable between a first position wherein the second member is retained with respect to the first member and a second position wherein the second member is not retained with respect to the first member;
 a spring biasing the movable arm into the first position.
 wherein the movable arm pivots along a track.

* * * * *